(12) United States Patent
Greenspan et al.

(10) Patent No.: US 9,846,648 B2
(45) Date of Patent: Dec. 19, 2017

(54) CREATE PAGE LOCALITY IN CACHE CONTROLLER CACHE ALLOCATION

(71) Applicant: Intel Corporation, Santa Clara, CA (US)

(72) Inventors: Daniel Greenspan, Jerusalem (IL); Anant V. Nori, Banglore (IN); Supratik Majumder, Bangalore (IN); Yoav Lossin, Jerusalem (IL); Asaf Rubinstein, Tel-Aviv (IL)

(73) Assignee: Intel Corporation, Santa Clara, CA (US)

( * ) Notice: Subject to any disclaimer, the term of this patent is extended or adjusted under 35 U.S.C. 154(b) by 158 days.

(21) Appl. No.: 14/709,323

(22) Filed: May 11, 2015

(65) Prior Publication Data

US 2016/0335187 A1    Nov. 17, 2016

(51) Int. Cl.
*G06F 12/0864* (2016.01)
*G06F 12/0846* (2016.01)
*G06F 12/128* (2016.01)
*G06F 12/123* (2016.01)

(52) U.S. Cl.
CPC ...... *G06F 12/0864* (2013.01); *G06F 12/0851* (2013.01); *G06F 12/123* (2013.01); *G06F 12/128* (2013.01); *G06F 2212/1024* (2013.01); *G06F 2212/6032* (2013.04); *Y02B 60/1225* (2013.01)

(58) Field of Classification Search
CPC ............ G06F 12/0864; G06F 12/0851; G06F 12/0886; G06F 12/122; G06F 12/128; G06F 2212/6032; G06F 2212/69; G06F 12/123; G06F 2212/1024

USPC .......................................................... 711/127
See application file for complete search history.

(56) References Cited

U.S. PATENT DOCUMENTS

| | | | | |
|---|---|---|---|---|
| 5,553,263 A | * | 9/1996 | Kalish ................. | G06F 12/0851 711/120 |
| 6,115,792 A | * | 9/2000 | Tran .................... | G06F 12/0864 711/118 |
| 6,687,789 B1 | * | 2/2004 | Keller ................. | G06F 12/0864 711/125 |
| 6,898,671 B2 | * | 5/2005 | Ito ........................ | G06F 12/0855 711/128 |
| 2002/0120817 A1 | * | 8/2002 | Lesartre ................ | G06F 12/128 711/128 |

(Continued)

*Primary Examiner* — Reginald Bragdon
*Assistant Examiner* — Aaron D Ho
(74) *Attorney, Agent, or Firm* — Lowenstein Sandler LLP

(57) ABSTRACT

Integrated circuits are provided which create page locality in cache controllers that allocate entries to set-associative cache, which includes data storage for a plurality of Sets of Ways. A plurality of cache controllers may be interleaved with a processor and device(s), and allocate to any pages in the cache. A cache controller may select a Way from a Set to which to allocate new entries in the set-associative cache and bias selection of the Way according to a plurality of upper address bits (or other function). These bits may be identical at the cache controller during sequential memory transactions. A processor may determine the bias centrally, and inform the cache controllers of the selected Set and Way. Other functions, algorithms or approaches may be chosen to influence bias of Way selection, such as based on analysis of metadata belonging to cache controllers used for making Way allocation selections.

22 Claims, 18 Drawing Sheets

(56) References Cited

U.S. PATENT DOCUMENTS

| | | | | |
|---|---|---|---|---|
| 2008/0052467 A1* | 2/2008 | Thompson | ............ | G06F 12/0864 |
| | | | | 711/128 |
| 2010/0191990 A1* | 7/2010 | Zhang | ................. | G06F 12/0864 |
| | | | | 713/320 |
| 2011/0072215 A1* | 3/2011 | Takahashi | ................ | G06F 9/325 |
| | | | | 711/125 |
| 2012/0030430 A1* | 2/2012 | Hayashi | .............. | G06F 12/0842 |
| | | | | 711/128 |
| 2012/0198171 A1* | 8/2012 | Chachad | ............ | H03K 19/0016 |
| | | | | 711/128 |
| 2015/0121011 A1* | 4/2015 | Huang | ................. | G06F 12/082 |
| | | | | 711/128 |

* cited by examiner

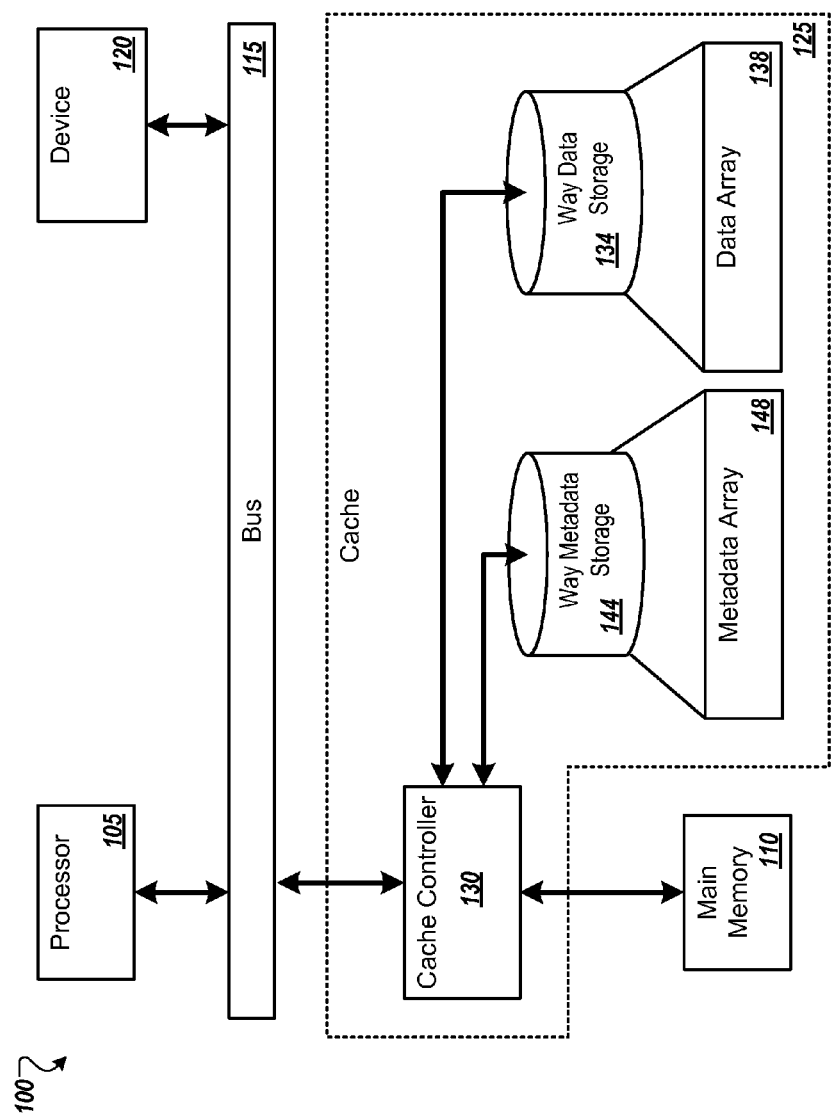

| Data Array |
|---|
| Data for Cache Controller Sets 0,1,2,3 Way 0 |
| Data for Cache Controller Sets 0,1,2,3 Way 1 |
| Data for Cache Controller Sets 0,1,2,3 Way 2 |
| Data for Cache Controller Sets 0,1,2,3 Way 3 |
| Data for Cache Controller Sets 0,1,2,3 Way 4 |
| Data for Cache Controller Sets 0,1,2,3 Way 5 |
| Data for Cache Controller Sets 0,1,2,3 Way 6 |
| Data for Cache Controller Sets 0,1,2,3 Way 7 |
| Data for Cache Controller Sets 4,5,6,7 Way 0 |
| Data for Cache Controller Sets 4,5,6,7 Way 1 |
| Data for Cache Controller Sets 4,5,6,7 Way 2 |
| Data for Cache Controller Sets 4,5,6,7 Way 3 |
| Data for Cache Controller Sets 4,5,6,7 Way 4 |
| Data for Cache Controller Sets 4,5,6,7 Way 5 |
| Data for Cache Controller Sets 4,5,6,7 Way 6 |
| Data for Cache Controller Sets 4,5,6,7 Way 7 |
| Data for Cache Controller Sets 8,9,10,11 Way 0 |
| Data for Cache Controller Sets 8,9,10,11 Way 1 |
| Data for Cache Controller Sets 8,9,10,11 Way 2 |
| Data for Cache Controller Sets 8,9,10,11 Way 3 |
| Data for Cache Controller Sets 8,9,10,11 Way 4 |
| Data for Cache Controller Sets 8,9,10,11 Way 5 |
| Data for Cache Controller Sets 8,9,10,11 Way 6 |
| Data for Cache Controller Sets 8,9,10,11 Way 7 |
| Data for Cache Controller Sets 12,13,14,15 Way 0 |
| Data for Cache Controller Sets 12,13,14,15 Way 1 |
| Data for Cache Controller Sets 12,13,14,15 Way 2 |
| Data for Cache Controller Sets 12,13,14,15 Way 3 |
| Data for Cache Controller Sets 12,13,14,15 Way 4 |
| Data for Cache Controller Sets 12,13,14,15 Way 5 |
| Data for Cache Controller Sets 12,13,14,15 Way 6 |
| Data for Cache Controller Sets 12,13,14,15 Way 7 |

| Metadata Array | |
|---|---|
| 300 | Tag, Valid, Dirty info for Cache Controller Set 0 Ways 0-7 |
| 301 | Tag, Valid, Dirty info for Cache Controller Set 1 Ways 0-7 |
| 302 | Tag, Valid, Dirty info for Cache Controller Set 2 Ways 0-7 |
| 303 | Tag, Valid, Dirty info for Cache Controller Set 3 Ways 0-7 |
| 304 | Tag, Valid, Dirty info for Cache Controller Set 4 Ways 0-7 |
| 305 | Tag, Valid, Dirty info for Cache Controller Set 5 Ways 0-7 |
| 306 | Tag, Valid, Dirty info for Cache Controller Set 6 Ways 0-7 |
| 307 | Tag, Valid, Dirty info for Cache Controller Set 7 Ways 0-7 |
| 308 | Tag, Valid, Dirty info for Cache Controller Set 8 Ways 0-7 |
| 309 | Tag, Valid, Dirty info for Cache Controller Set 9 Ways 0-7 |
| 310 | Tag, Valid, Dirty info for Cache Controller Set 10 Ways 0-7 |
| 311 | Tag, Valid, Dirty info for Cache Controller Set 11 Ways 0-7 |
| 312 | Tag, Valid, Dirty info for Cache Controller Set 12 Ways 0-7 |
| 313 | Tag, Valid, Dirty info for Cache Controller Set 13 Ways 0-7 |
| 314 | Tag, Valid, Dirty info for Cache Controller Set 14 Ways 0-7 |
| 315 | Tag, Valid, Dirty info for Cache Controller Set 15 Ways 0-7 |

| | Data Array |
|---|---|
| 500 | Data for Cache Controller Sets A0, B0, C0, D0 Way 0 |
| 501 | Data for Cache Controller Sets A0, B0, C0, D0 Way 1 |
| 502 | Data for Cache Controller Sets A0, B0, C0, D0 Way 2 |
| 503 | Data for Cache Controller Sets A0, B0, C0, D0 Way 3 |
| 504 | Data for Cache Controller Sets A0, B0, C0, D0 Way 4 |
| 505 | Data for Cache Controller Sets A0, B0, C0, D0 Way 5 |
| 506 | Data for Cache Controller Sets A0, B0, C0, D0 Way 6 |
| 507 | Data for Cache Controller Sets A0, B0, C0, D0 Way 7 |
| 508 | Data for Cache Controller Sets A1, B1, C1, D1 Way 0 |
| 509 | Data for Cache Controller Sets A1, B1, C1, D1 Way 1 |
| 510 | Data for Cache Controller Sets A1, B1, C1, D1 Way 2 |
| 511 | Data for Cache Controller Sets A1, B1, C1, D1 Way 3 |
| 512 | Data for Cache Controller Sets A1, B1, C1, D1 Way 4 |
| 513 | Data for Cache Controller Sets A1, B1, C1, D1 Way 5 |
| 514 | Data for Cache Controller Sets A1, B1, C1, D1 Way 6 |
| 515 | Data for Cache Controller Sets A1, B1, C1, D1 Way 7 |
| 516 | Data for Cache Controller Sets A2, B2, C2, D2 Way 0 |
| 517 | Data for Cache Controller Sets A2, B2, C2, D2 Way 1 |
| 518 | Data for Cache Controller Sets A2, B2, C2, D2 Way 2 |
| 519 | Data for Cache Controller Sets A2, B2, C2, D2 Way 3 |
| 520 | Data for Cache Controller Sets A2, B2, C2, D2 Way 4 |
| 521 | Data for Cache Controller Sets A2, B2, C2, D2 Way 5 |
| 522 | Data for Cache Controller Sets A2, B2, C2, D2 Way 6 |
| 523 | Data for Cache Controller Sets A2, B2, C2, D2 Way 7 |
| 524 | Data for Cache Controller Sets A3, B3, C3, D3 Way 0 |
| 525 | Data for Cache Controller Sets A3, B3, C3, D3 Way 1 |
| 526 | Data for Cache Controller Sets A3, B3, C3, D3 Way 2 |
| 527 | Data for Cache Controller Sets A3, B3, C3, D3 Way 3 |
| 528 | Data for Cache Controller Sets A3, B3, C3, D3 Way 4 |
| 529 | Data for Cache Controller Sets A3, B3, C3, D3 Way 5 |
| 530 | Data for Cache Controller Sets A3, B3, C3, D3 Way 6 |
| 531 | Data for Cache Controller Sets A3, B3, C3, D3 Way 7 |

| Metadata Array |
|---|
| Tag, Valid, Dirty info for Cache Controller A Set 0 Ways 0-7 |
| Tag, Valid, Dirty info for Cache Controller B Set 0 Ways 0-7 |
| Tag, Valid, Dirty info for Cache Controller C Set 0 Ways 0-7 |
| Tag, Valid, Dirty info for Cache Controller D Set 0 Ways 0-7 |
| Tag, Valid, Dirty info for Cache Controller A Set 1 Ways 0-7 |
| Tag, Valid, Dirty info for Cache Controller B Set 1 Ways 0-7 |
| Tag, Valid, Dirty info for Cache Controller C Set 1 Ways 0-7 |
| Tag, Valid, Dirty info for Cache Controller D Set 1 Ways 0-7 |
| Tag, Valid, Dirty info for Cache Controller A Set 2 Ways 0-7 |
| Tag, Valid, Dirty info for Cache Controller B Set 2 Ways 0-7 |
| Tag, Valid, Dirty info for Cache Controller C Set 2 Ways 0-7 |
| Tag, Valid, Dirty info for Cache Controller D Set 2 Ways 0-7 |
| Tag, Valid, Dirty info for Cache Controller A Set 3 Ways 0-7 |
| Tag, Valid, Dirty info for Cache Controller B Set 3 Ways 0-7 |
| Tag, Valid, Dirty info for Cache Controller C Set 3 Ways 0-7 |
| Tag, Valid, Dirty info for Cache Controller D Set 3 Ways 0-7 |

Rows labeled 600–615. Array labeled 448.

FIGURE 6

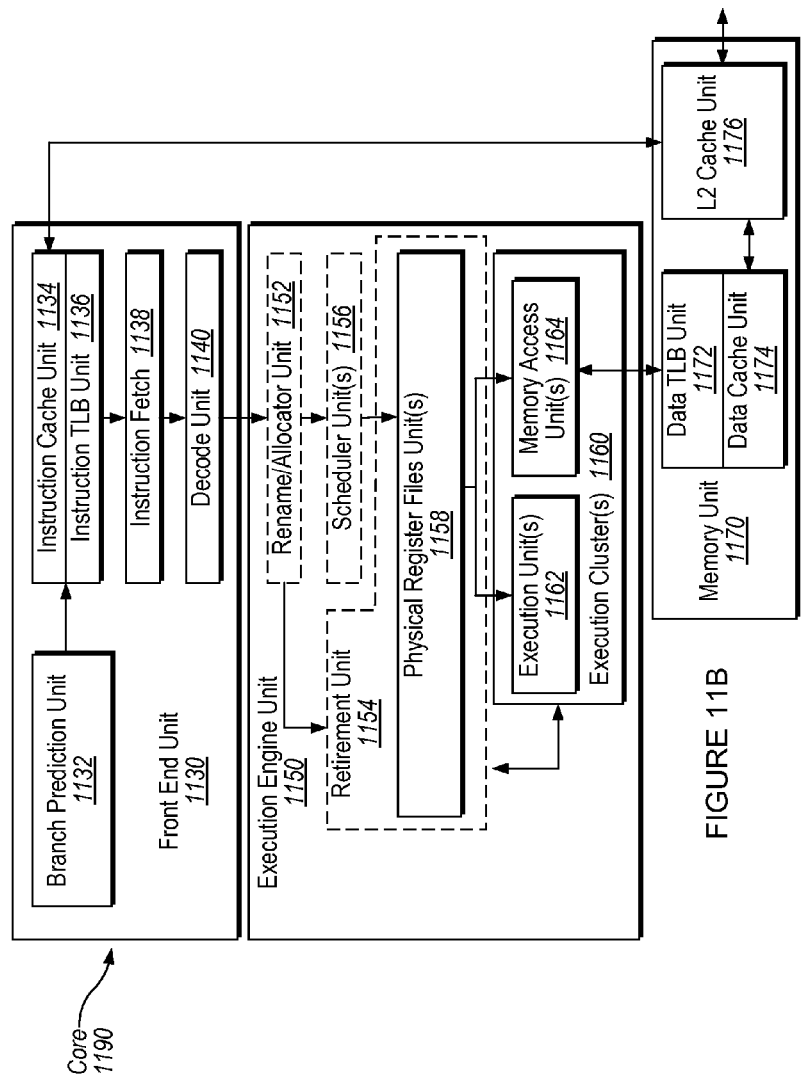
FIGURE 11A
FIGURE 11B

CREATE PAGE LOCALITY IN CACHE CONTROLLER CACHE ALLOCATION

The present disclosure relates to the field of memory management and, in particular, to the creation of page locality with cache controllers that allocate entries to cache memory.

BACKGROUND

A cache is a computer component that transparently stores data such that future requests for that data can be provided faster. Data stored in a cache can include unique values that have been computed earlier or duplicates of original values that are stored elsewhere, such as in a far (or main) memory. If requested data is in the cache, this request can be handled by reading the cache, which is comparatively faster than reading far-memory. Otherwise the requested data is fetched from its original storage location. Thus, requests for data that is in the cache can typically be handled faster than for data that is not in the cache.

Although faster, storing and retrieving from cache creates challenges that slow down cache accesses. Cache operations, particularly set-associative cache operations, inherently break address locality such as to create additional open and close events (e.g., opening a new cache block or Way or closing a new cache block or Way). Additional open and close events add delays and increases cache response times, thus reversing, to some extent, the advantage of use of cache for fast access memory storage and reducing performance for some workloads when compared to a system that has only fast access memory storage and no far memory.

BRIEF DESCRIPTION OF THE DRAWINGS

FIG. 1 is a block diagram of an example system architecture that implements allocation to set-associative memory-side cache.

FIG. 2 is an example of a data array found within a Way data storage of FIG. 1.

FIG. 3 is an example of a metadata array found within a Way metadata storage of FIG. 1.

FIG. 5 is an example of a metadata array found within a Way metadata storage of FIG. 4.

FIG. 6 is an example of a metadata array found within a Way metadata storage of FIG. 4.

FIG. 11A is a block diagram illustrating an in-order pipeline and a register renaming stage, out-of-order issue/execution pipeline according to one embodiment.

FIG. 11B is a block diagram illustrating a micro-architecture for a processor that create page locality across interleaved cache controllers that allocate entries to fast-access cache memory according to one embodiment.

DESCRIPTION OF EMBODIMENTS

Figure 4:
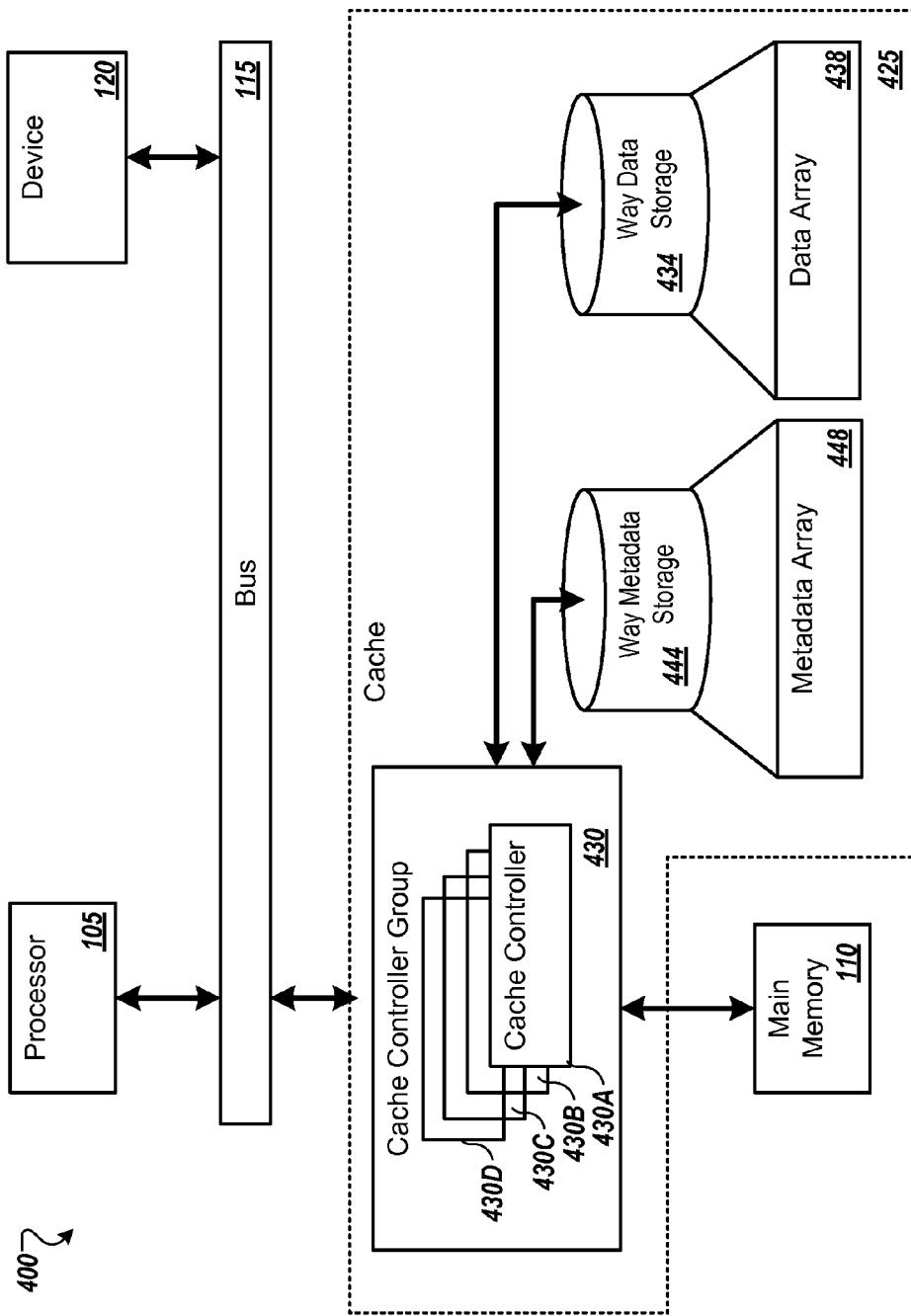
FIG. 4 is a block diagram of the example system architecture of FIG. 1, illustrating a cache controller group including a plurality of interleaved cache controllers.

Integrated circuits are provided which create page locality in cache controllers that allocate entries to set-associative, memory-side cache, which includes data storage for a plurality of Sets of Ways. In one example, a cache controller is coupled with a processor and other system components. "Coupled with" is understood to include directly connected to a component or indirectly communicating through one or more intermediate components. The cache controller may allocate memory within set-associative cache by selecting a Way from an appropriate Set to which to allocate new entries in the set-associative cache. The Way may be selected by way of a biasing process in which the selected Way of the Set (or series of Sets) is considered preferred over other Ways of the Set. In one embodiment, the Way is considered preferred based on upper address bits of memory transactions that are typically identical at the cache controller during sequential memory transactions.

In another example, the cache controller of the above example is replaced with a cache controller block that includes a plurality of cache controllers interleaved with the processor and system components (or devices). The plurality of interleaved cache controllers may allocate cache entries within the plurality of Sets of Ways of the set-associative cache, which may include multiple interleaved caches in some embodiments. The cache controllers may also be made as an agent or subpart of the processor and thus share processing capabilities or be more easily directed by the processor in selection of the Way within Set(s). When the cache controller(s) jointly determine the preferred Way, or when the processor determines the preferred Way within a Set and communicates the identity of the preferred Way to the cache controllers, the disclosed embodiments are performed centrally.

Other functions, algorithms or approaches may be chosen to influence bias of Way selection, such as based on analysis of metadata related to data in the Ways within the Sets of the set-associative cache. More specifically, the processor (or cache controller(s)) may analyze metadata belonging to the multiple cache controllers when making the Way selection. The processor (or cache controller(s)) may select a preferred Way within Sets of the set-associative cache to which to allocate cache entries based on the analysis of the metadata of the different cache controllers, based on an analysis of a stream of requests going to the multiple cache controllers, and/or based on some function of the requests, e.g., parts of memory addresses within the requests, for example. The processor may then communicate the preferred Way that has been selected to the cache controllers to which to allocate new entries.

Alternatively, or additionally, the cache controllers may sequentially inform each other of the selected Way. For example, a first cache controller may select a Way to which to allocate memory entries in an appropriate Set. The first cache controller may then inform the other cache controllers. For example, the first cache controller may inform a next-higher-numbered cache controller (or second cache controller) of the selected Way for that Set, so that this second cache controller may also allocate entries to the Way during a memory transaction, particularly for a memory transaction to a subsequent address. This sequential notification of the Way to the next-higher-numbered cache controller may continue during a memory transaction. The process can continue until a cache controller receives a request that does not, in Way data storage, have locality with the allocated Sets and Way of the previous controller or until some other reset in cache controller allocation.

Throughout the disclosed embodiments for Way selection, while the Way that is selected may change because the selected Way of a Set may not be appropriate for allocation of a new entry, preferring a Way selection across cache controllers ensures that sequential memory entries appear in the same Way in adjacent cache controllers the majority of the time, thus greatly reducing page open and close penalties associated with accessing data from differing Ways across sequential sets of a single or interleaved caches. By reducing page open/close delay penalties, overall cache response times may be improved and system power may be saved.

FIG. 1 is a block diagram of an example system architecture 100 that implements allocation to set-associative memory-side cache. The system architecture 100 may include a processor 105 coupled with a main memory 110 via a bus 115. The system architecture 100 may also include a device 120 (e.g., an I/O device) coupled with the processor 105 through the bus. The system architecture 100 also includes a cache 125 interposed between the bus 115 and the main memory 110 that inspects and is able to act on transactions directed to the main memory 100. The cache 125 may include, but not be limited to, a cache controller 130, a Way data storage 134 in which is stored data array 138, and a Way metadata storage 144 in which is stored a metadata array 148. In some implementations, the Way metadata storage 144 and the Way data storage 134 may be combined.

The processor 105 may be any type of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. Processor 105 may include multiple threads and multiple execution cores, in any combination. In one embodiment, the processor 105 is integrated in a single integrated circuit die having multiple hardware functional units (hereafter referred to as a multi-core system). The multi-core system may be a multi-core processor package, but may include other types of functional units than just processor cores. Functional hardware units may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof.

The memory 110 may include any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), or other storage or memory device. The memory 110 stores instructions and/or data represented by data signals that are to be interpreted and/or executed by the processor 105. The processor 105 may be coupled towards the memory 110 via bus 115. In some embodiments, the memory 110 is a dual-inline memory module (DIMM). The memory 110 may also include volatile memory, such as in the form of random access memory (RAM) or registers.

The device 120 may be a device (e.g., an input-output (I/O) device), a driver belonging to an I/O device, or software program capable of accessing (e.g., reading from, writing to) the memory 110. When the device is a driver, the driver may be running on the processor 105 even though the driver belongs to an I/O device. An example of the device 120 may include a graphics device or graphics driver. The device 120 may receive or be assigned a memory address, multiple memory addresses, a block of memory address, or multiple blocks of memory addresses (hereafter referred to collectively as "an address"). For example, an operating system (not shown) may assign the device 120 an address to use during operation. Alternatively, the device 120 may arbitrarily select an address from a list of available memory addresses. The device 120 may also be integrated with the processor 105 as part of a system-on-a-chip (SoC).

The cache 125 is shown as a single-level memory-side cache, although the techniques described may be applied to one or more levels of cache within one or more cores, a set of one or more shared cache units and external memory 110. The set of shared cache units may include one or more mid-level caches, such as level 2 (L2), level 3 (L3), level 4 (L4), or other levels of cache, a last level cache (LLC), and/or combinations thereof. Any number of cache configurations and cache sizes are contemplated. Depending on the architecture, the cache 125 may be a single internal cache located on an integrated circuit or may be multiple levels of internal caches on the integrated circuit. For configurations with multiple cache levels, the caches can be configured to be inclusive or non-inclusive. Other embodiments include a combination of both internal and external caches depending on particular embodiments.

Caches may be configured in different schemes, generally referred to as direct mapped, fully associative and set-associative. The cache 125 may be a set-associative cache for purposes of the present disclosure, and thus include one or more cache Ways organized within cache Sets into which the cache is divided (see FIGS. 2-3). Each cache Way may include a metadata block that includes an address reference to actual data fetched from a main memory (e.g., a tag), and a data block (e.g., a cache line that contains data fetched from the main memory).

Set-associative cache is a hybrid between a fully associative cache and direct-mapped cache. Caches are generally divided into multiple equal sections called cache Ways (or slots or blocks). A set-associative scheme works by grouping the cache Ways into Sets to create a set-associative scheme, where each Set corresponds to a set of main memory locations. For example, a main memory can have 1000 memory locations and may be divided into four Sets. A first set of the main memory locations can include locations 1-250, a second set of the main memory locations may include locations 251-500, and so forth. The set-associative cache may have 200 Ways that can be grouped into 4 Sets of 50 Ways, where each Set of Ways corresponds to a set of main memory locations. For example, a first Set of Ways can include 50 ways in which data from any of the first set of the main memory locations (memory locations 1-250) can be stored. In common implementations, grouping of the main memory locations into sets is done using a modulus function, such that, for example, the first set of 250 memory locations contains locations 1, 5, 9 . . . and the second set of 250 memory locations contains locations 2, 6, 10, and so forth.

A set-associative scheme is considered a reasonable compromise between the power-hungry hardware needed for fully associative caches (which requires parallel searches of all Ways) and the simplistic direct-mapped scheme, which may cause collisions of addresses to the same Way (similar to collisions in a hash table). The fewer Ways needed to be searched, the less hardware is required. Common choices, therefore, include 4-Way or 8-Way associative caches in which Sets are groups of four or eight Ways, respectively. So, in a cache with 128 Ways and 8 Ways per Set, there are 16 Sets, for example, which may be numbered 0 to 15. An individual Way within the cache may be referenced by the Set number and by the Way within the Set, for example "Set 14, Way 5."

With further reference to FIGS. 1, 2 and 3, transactions from the processor 105 or the device 120 that are directed to main memory pass through the cache 125. The Way data storage 134 may store a number of data arrays 138, an example of which is illustrated in FIG. 2, in which data belonging to a series of Ways of the same number belonging to several Sets are grouped into respective Pages 200-231, or 32 total Pages shown only by way of example. For example, data for cache controller Way 0 of Sets 0, 1, 2, and 3 (e.g., a first series of Sets) are stored in Page 200. Data for cache controller Way 1 of Sets 0, 1, 2, 3 and are stored in Page 201, and so forth.

The Way metadata storage 144 may store additional information relating to the data stored in the Ways within the Way data storage 134. This additional information may be formatted as a metadata array 148, an example of which is illustrated in FIG. 3. Way metadata may include additional information relating to each Way that may be used for deciding on Way allocation, including a tag (which may be used to derive the address in main memory which is to be cached by that Way), valid bits (which indicate that the Way data storage does indeed hold valid data associated with that address in main memory), and dirty bits (which indicate that the data in the Way data storage associated with that address in main memory has been modified since being read from main memory and will need to be copied back to main memory at some point).

Sixteen Pages of data 300-315 may each hold metadata for all the Ways belonging to a Set (e.g., a Set 0 through 15) of the Way data storage 134. This arrangement facilitates rapid delivery of the metadata to the cache controller 130 for the derived Set, allowing an efficient search for a tag that matches the desired main-memory-reference. Typically, for each quantity of Way data held in the Way data storage 134, a much smaller quantity of Way metadata is held in the Way metadata Storage 144. Accordingly, the Way metadata storage 144 structure may be much smaller than the Way data storage 134 structure.

Consider the example where a read transaction is sent towards main memory 110 from the processor 105 or the device 120. The cache controller 130 may first see the read transaction. The cache controller 130 may then derive the Set of cache Ways applicable to the read transaction from the main-memory-referencing address supplied with the read transaction. The cache controller 130 may retrieve from the Way metadata Storage 150 the tag and valid bit information pertaining to all Ways of the derived Set. The cache controller 130 may examine the tag and valid bit information retrieved to determine whether a copy of the data stored in main-memory at the main-memory-referencing address supplied with the read transaction is indeed held by one of the Ways of the derived Set. If such a copy is held, the cache controller 130 may extract the data of this copy by referencing data held for the Way within the Set from the Way data storage 134.

With further reference to FIG. 2, when successive accesses to data within the cache 125 are to the same Page of Way data storage, a corresponding page locality effect results in significantly improved performance of the cache 125 in terms of shorter access time, lower power consumption, lower wear, and the like, due to fewer page open/close events required for those data accesses. For example, a series of accesses to Pages 211, 209, 213 and to 215 will perform significantly worse than a series of four accesses to Page 211.

The present disclosure may be most applicable to cases where the page size of the Way data storage 134 is larger than that of the data for a single Way. Thus, a single Page of Way data storage 134 can contain data for multiple Ways. The data in the Way data storage 134 may be arranged such that data belonging to a particular Way number for a series of Sets shares each page of the stored data array 138, and as illustrated in FIG. 2. For example the following Set, Way combinations may be stored in Page 200 of the Way data storage: (Set 0, Way 0); (Set 1, Way 0); (Set 2, Way 0) and (Set 3, Way 0). Within such an arrangement, the page locality effect will occur if we can arrange to read data from a particular Way from a series of Sets irrespective of the actual Way chosen, provided that the Way is the same for each Set. The purpose of the disclosed methods and/or algorithms is to increase the likelihood of that occurring.

FIG. 4 is a block diagram of an example system architecture 400 similar to that of FIG. 1, but illustrating a cache 425 with a cache controller group 430 including a plurality of interleaved cache controllers 430A, 430B, 430C, and 430D. Fewer or more cache controllers may be interleaved in various embodiments. The various views of the Figures herein may include corresponding components carrying corresponding numbering to indicate similarity, in which case the function of such a component may not be explained in further detail.

The cache controllers 430A, 430B, 430C, and 430D may be used to implement the memory-side-cache 425 allocation in an interleaved manner. The interleaving may be arranged such that, for a stream of requests to sequential main-memory-referencing addresses, individual requests are directed to the cache controllers such that each interleaved controller may provide access to a full Way's size worth of data and then requests are sent to each next interleaved cache controller in turn.

The operation of the interleaved cache controllers 430A-430D may be such that the Way metadata storage 444 and the Way data storage 434 elements are shared between the four cache controllers 130A-130D. Compared to the system architecture 100 of FIG. 1, the Sets are renumbered, such that Sets 0,1,2,3 that belong to the cache controller 130 of FIG. 1 become, in the arrangement of FIG. 4, Sets A0, B0, C0, and D0 that belong to the cache controllers 430A, 430B, 430C, and 430D, respectively. Likewise, Sets 4,5,6,7 that belong to cache controller 430 become Sets A1, B1, C1, and D1 of cache controllers 430A, 430B, 430C, and 430D, respectively, and so on. In this manner, the overall size and arrangement of Way metadata storage 444 and Way data storage 434 elements is not changed, but the work of servicing transactions and maintaining the cache may be split between four cache controllers (or whatever number of cache controllers the system architecture 400 may employ).

FIG. 5 is an example of a data array 438 found within the Way data storage 434 of the system architecture 400. As with the data array 138 of FIG. 1, the (Set, Way) combinations are distributed throughout Pages 500-531 of the data array 438. The interleaved nature of the Set, Way assignments changes the Page distribution such that, e.g., data for cache controller Sets A0, B0, C0, and D0 with Way 0 is assigned to Page 500 (where each interleaved cache controller helps with servicing and maintaining transactions for its respective Set 0, Way 0). Furthermore, data for cache controller Sets A0, B0, C0, and D0 with Way 1 is assigned to Page 501, and so on, as illustrated.

FIG. 6 is an example of a metadata array 448 found within the Way metadata storage 444 of the system architecture 400. Once again, the metadata in the metadata array 448 may include additional information related to each Way, e.g., the tag, valid bits, and dirty bits corresponding to data referenced in the Way data storage 434, which was also discussed with reference to FIG. 3. Now, however, the metadata is also interleaved across the interleaved cache controllers 430A-430D and plurality of Pages 600-615 (sometimes referred to herein as cache controllers A through D for simplicity). For example, metadata for cache controller A's Set 0, e.g., Set A0 (for all Ways) may be stored in Page 600, and metadata for cache controller B's Set 0, e.g., Set B0 (for all Ways) may be stored in Page 601, and so on through Page 615 (and beyond to whatever number of pages of metadata in the metadata arrays 448).

When allocating to set-associative cache with the interleaved cache controllers 430A-430D, main-memory-referencing addresses may be broken down such that a first plurality of bits (e.g., the lowest four or five bits) determine the offset within a Way, the next plurality of bits (e.g., the next one or two bits) determine which of the interleaved cache controllers is to handle the access, the next plurality of bits (e.g., the next four or five bits) determine the Set where the Way is located, and the last (upper) address bits (e.g., bits [31:12] in a 32-bit wide address) determine the tag, for which a match is sought in cache. In the above example with 16 sets, four (4) bits are used to map the 16 Sets. These four bits may be located in the middle of the address, between the cache-controller-interleave bits and the tag bits.

For the system architecture 400 of FIG. 4, a page locality effect will occur if we can arrange to read data from a particular Way from a series of Sets having the same Set number (but different letters), across the four interleaved Cache Controllers 430A, 430B, 430C, and 430D. The purpose of the disclosed embodiments discussed in more detail below is to increase the likelihood of that occurring.

Caching operations, however, by their nature, break down address locality such that allocations of sequential addresses get spread out within the cache. Allowing sequential memory allocations to jump across Ways when changing from one Set to the next creates additional page (open/close) penalties. If allocations for the same memory transaction remain within the same Way, no additional penalty is incurred. When two Ways are opened sequentially or simultaneously across multiple Sets that have data locality or nearby system addresses (whether the Sets are in interleaved caches or sequential sets in the same cache), a penalty is incurred only once, despite two Ways being accessed, thus improving overall cache response times.

In some cases, interleaved cache controllers may independently come to similar decisions regarding the preferred Way for nearby system memory addresses. For example, statistically, there is a one in eight (or 12.5%) chance (where there are eight Ways per Set) that two cache controllers will choose the same Way for nearby system memory addresses, leading to some performance improvement, even if only by chance. The mechanisms for Way biasing described herein are designed to increase this likelihood of the same Way being chosen, allowing for even better performance improvements on a greater proportion of sequential accesses to the cache when compared to random chance.

Figure 7A:
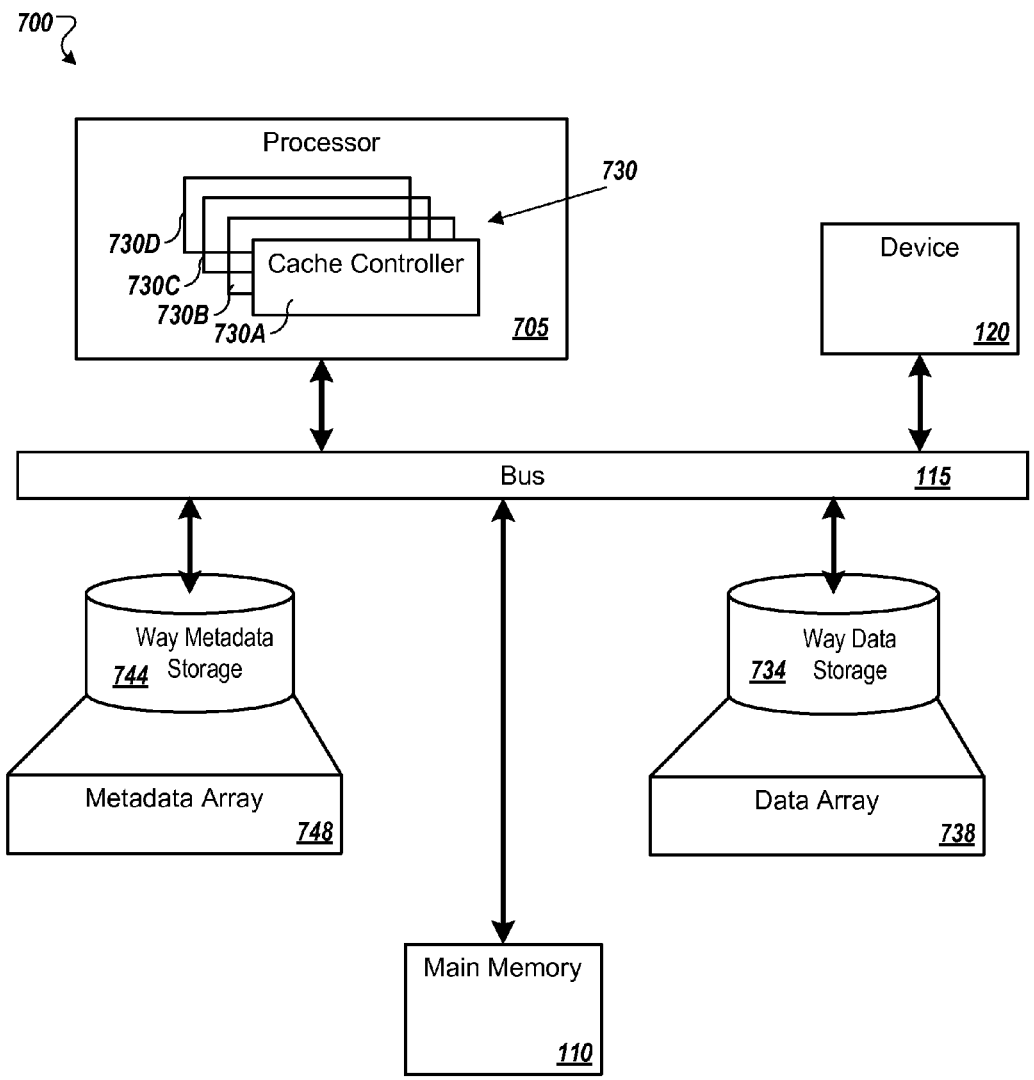
FIG. 7A illustrates a block diagram illustrating an example system architecture for creating page locality in cache allocation across interleaved cache controllers.

FIG. 7A illustrates a block diagram illustrating an example system architecture 700 for creating page locality in cache allocation across interleaved cache controllers according to some embodiments. More specifically, a plurality of interleaved cache controllers 730A, 730B, 730C, and 730D of a cache controller group 730 may be shared agents of a processor 705 (e.g., connected logically to each other). In this way, the interleaved cache controllers may jointly analyze the metadata within the metadata array 748 of the Way metadata storage 748, and come to a common decision of a preferred Way to choose for allocation of cache entries. In other embodiments, the processor 705 may perform the analysis and communicate to the interleaved cache controllers the preferred Way to select for allocation.

In another example, the cache controllers 730A-730D may sequentially inform each other of the selected Way, particularly while the processor 705 is executing the same or related memory transaction. The informing may occur sequentially by numbered cache controller, e.g., cache controller 730A may inform cache controller 730B that cache controller 730A is using Way_1 (regardless of Set). Cache controller 730A may allocate to Way_1 and then inform cache controller 730B of its use of Way_1, and so forth. This process is further discussed with reference to FIG. 10.

Figure 7B:
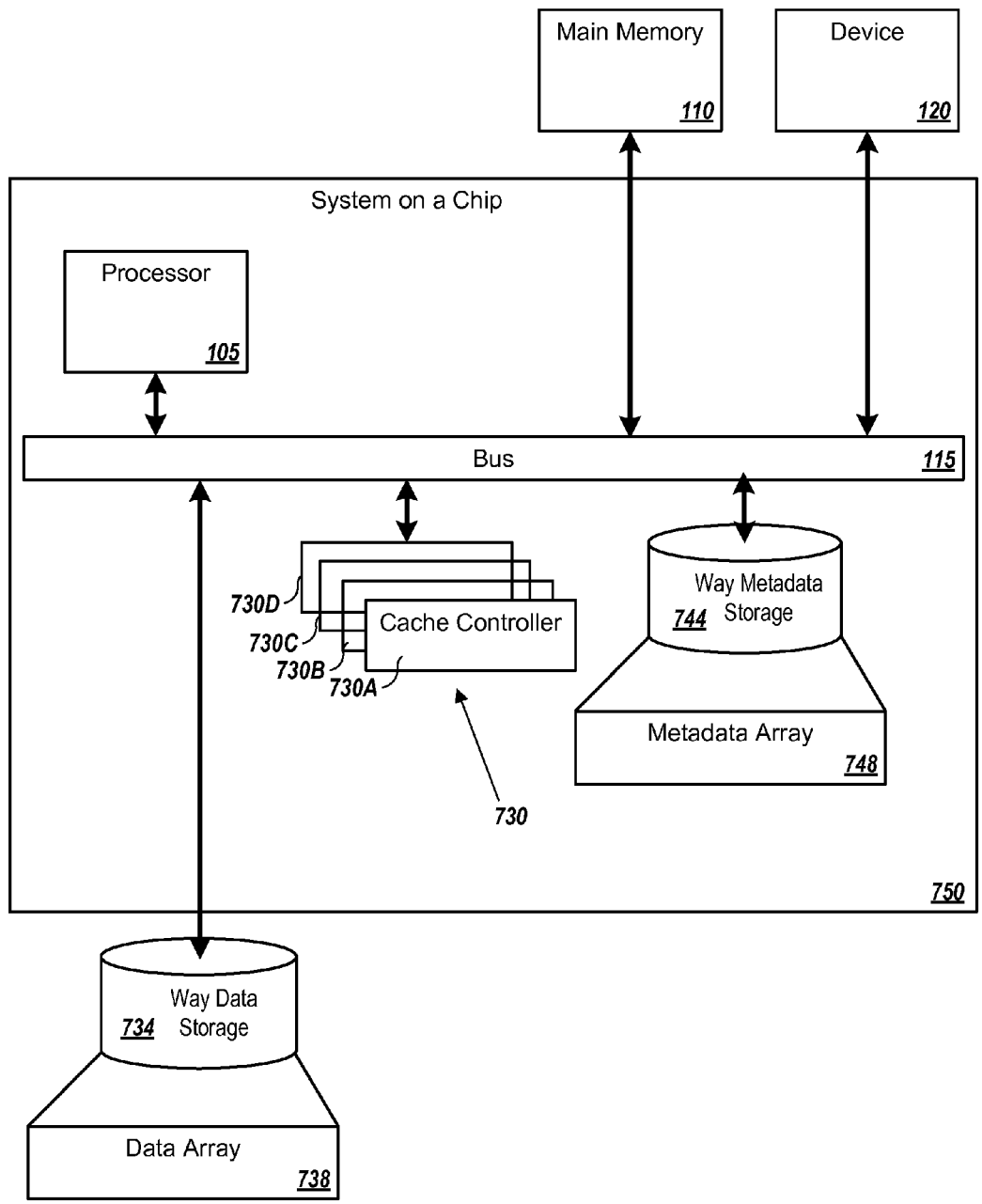
FIG. 7B illustrates a block diagram illustrating an example system on a chip (SoC) to create page locality in cache allocation across interleaved cache controllers.

FIG. 7B illustrates a block diagram illustrating an example system on a chip (SoC) 750 to create page locality in cache allocation across interleaved cache controllers according to some embodiments. The SoC 750 includes an integrated circuit that may include the processor 105, the cache controller group 730 of the interleaved cache controllers 730A-730D (such as shown in FIG. 7A), and the Way metadata storage 744, all communicatively coupled with the bus 115. The SoC 750 may be specially designed to put the logic from the disclosed algorithms onto a single die, making the implementation thereof faster, reducing data transfer energy, and making the SoC smaller and easier to assemble than individual components.

As illustrated, the memory 110, the device 120 (e.g., IO device), and the Way data storage 734 may also be operatively coupled with the SoC 190 via the bus 115, although optionally being located outside of the SoC. In some embodiments, at least one of the memory 110, device 120 and data storage 150 are also disposed on the SoC 750. Corresponding numbering across Figures in the present disclosure may correspond to similar or exact structure or components throughout the various views of the Figures.

Figure 8:
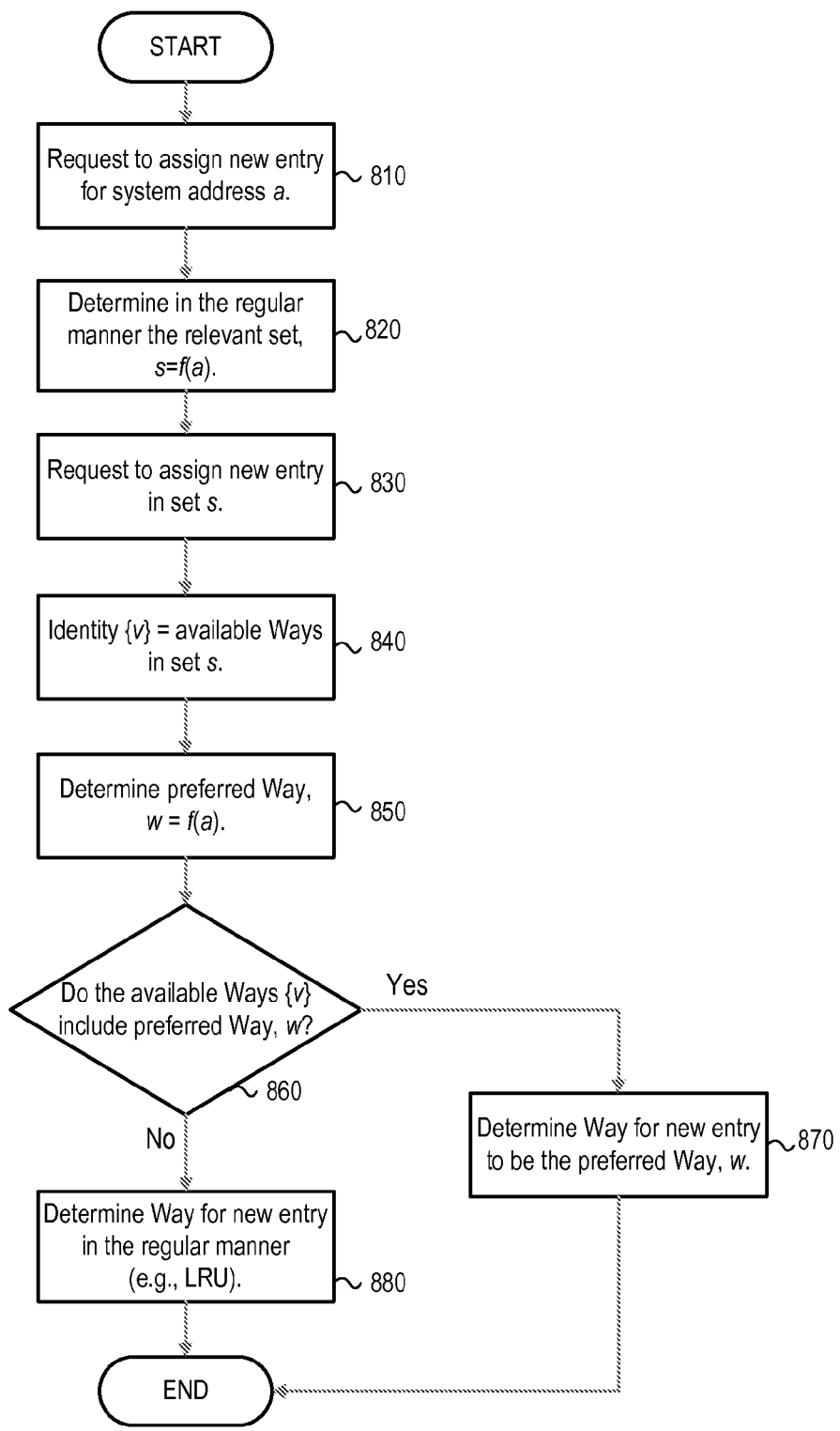
FIG. 8 is a flow chart of an exemplary method for Way cache allocation by cache controller(s) according to one embodiment.

FIG. 8 is a flow chart of an exemplary method for Way cache allocation by cache controller(s) according to one embodiment that creates page locality in memory allocations to fast-access cache memory. The method may relate to a fully distributed way bias algorithm as a process by which to increase the likelihood that the same Way will be chosen (particularly for allocations distributed across sequentially-numbered Sets of set-associative cache). The method may be implemented by the system architectures disclosed herein.

The method of FIG. 8 may begin with a request to assign a new entry for a system address (e.g., address a) (810). The method may then determine in the regular manner the relevant set, e.g., s=$f$(a), where "s" stands for Set (820). In one example, the function $f$(a) may be a[24:21] XOR a[15:12]. The method may continue by making a request to assign a new entry in set s (830). The method may continue by identifying a number of available Ways (e.g., {v}) in Set s to which to allocate the new entry (840). This is not just the LRU (Least Recently Used); for example, the method may determine the eight least recently used clean entries plus the two least recently used dirty entries and base selection of the Ways {v} on this information.

The method may then continue to determine a preferred Way to which to allocate the new entry (850). For example, the preferred Way may be delineated as w=$f$(a). The system address bits used should be above the address interleave granularity and also include bits that are not used in the Set determination. For example, the function for the preferred Way could be w=a[19:16] or could be a[24:21] XOR a[19:16] by way of two examples. In some embodiments the function is a distribution function that allocates new entries for memory transactions that naturally compete to be stored in a particular Set to each prefer a different Way of the Set.

The method of FIG. 8 may further determine whether the available Ways {v} include the preferred Way, w (860). If yes, the method determines that the Way for allocation of the new entry is to be the preferred Way, w (870). If no, the method determines a Way for the new entry in the regular manner, e.g., least recently used (LRU) (880). The cache controllers may then allocate the new entry to the selected Way (whether from 870 or from 880).

Figure 9:
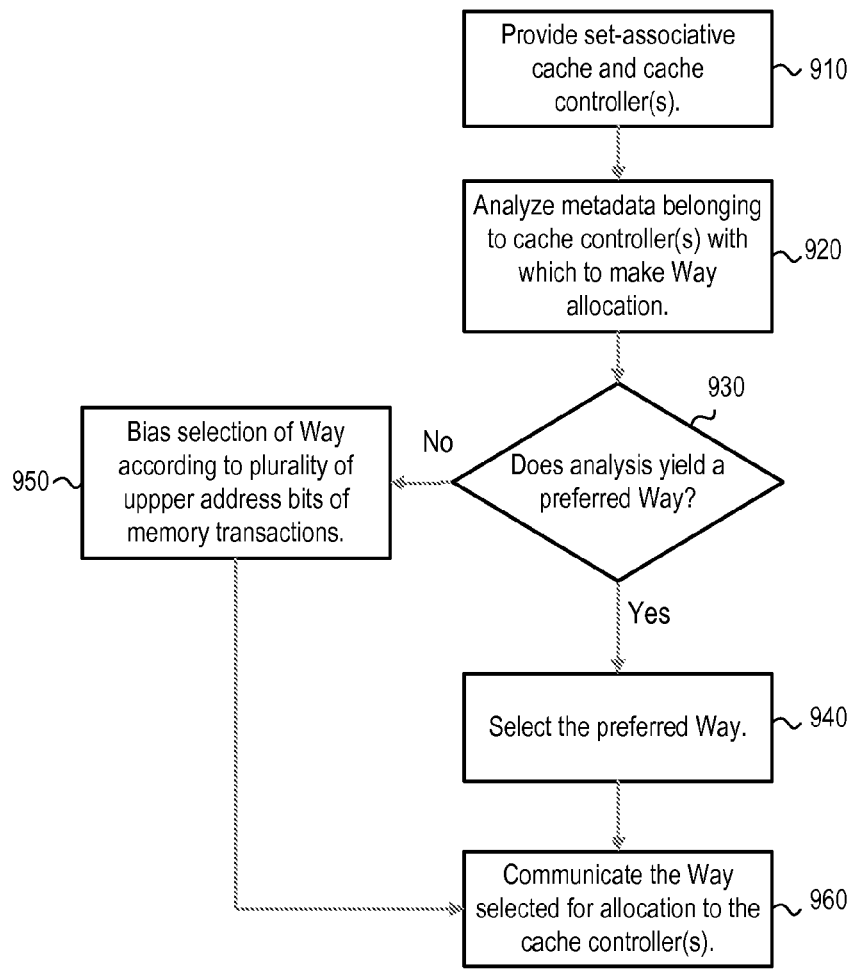
FIG. 9 is a flow chart of an exemplary method for Way cache allocation by cache controller(s) according to another embodiment.

FIG. 9 is a flow chart of an exemplary method for Way cache allocation by cache controller(s) according to another embodiment. The method may provide set-associative cache and one or more cache controller(s) (which may be interleaved in one embodiment) (910), and be executed by a processor, by the cache controller(s) or other logic. The method may further analyze metadata belonging to the cache controller(s) when making a Way selection within a Set of the set-associative cache to which the cache controller(s) allocate entries (920). The method may further determine whether the analysis of the metadata yields a preferred Way as done in the method of FIG. 8 or whether the Way number is assigned to nearby system memory addresses in nearby Sets such as to benefit from page locality (930).

When the analysis of the metadata does yield a preferred Way, the method may select the preferred Way (940) and communicate that Way to the cache controller(s) for use in allocating new entries to the set-associative cache (960). When the analysis of the metadata does not yield a preferred Way and is thus unhelpful, the method may continue with biasing selection of a Way according to a plurality of upper address bits of memory transactions (950). The upper address bits are normally identical for sequential memory transactions (such as, for example, all related to execution of the same application or process). The method may then finish with communication of the selected Way from the biasing to the cache controller(s) for use in allocating new entries to the set-associative cache (960). When the cache controller(s) themselves conduct the analysis as explained with reference to FIG. 7A, the cache controller(s) already know the selected Way, and may use the Way jointly selected by the cache controller(s).

In some embodiments, the bias and/or algorithm applied by the method illustrated in FIG. 9 may be provided centrally (e.g., as directed by a processor or a group of cache controllers) by executing a mechanism that looks at the metadata of the cache controllers in the Way metadata storage, identifies a suitable way that can be used by multiple cache controllers, and communicates this to respective cache controllers.

Figure 10:
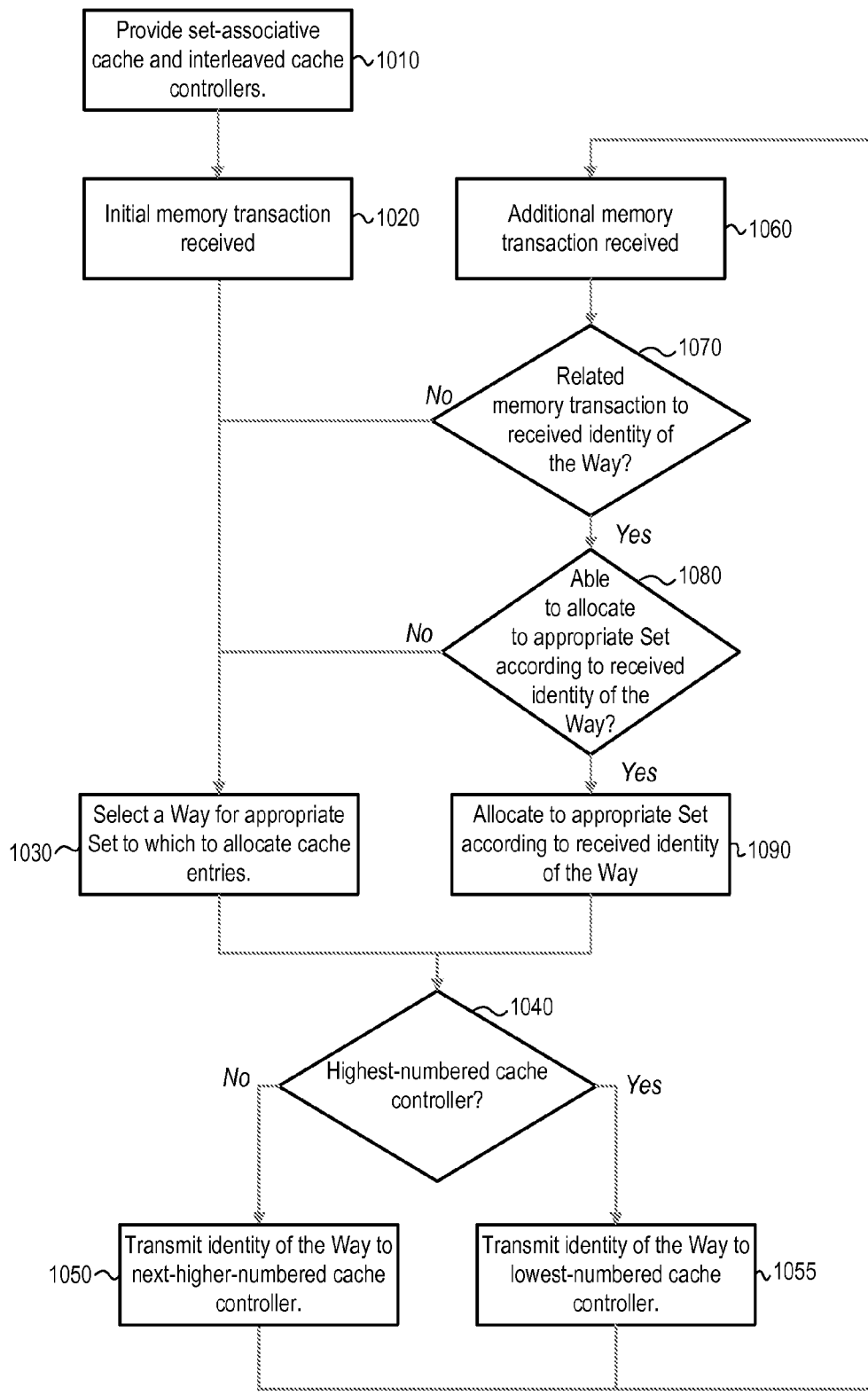
FIG. 10 is a flow chart of an exemplary method for Way cache allocation by interleaved cache controllers according to one embodiment.

FIG. 10 is a flow chart of an exemplary method for Way cache allocation by interleaved cache controllers according to yet another embodiment. The algorithm may be implemented in a distributed, connected method using a ripple effect, whereby the lowest-numbered cache controller (which will generally handle the earlier requests during a sequential memory operation) advises the next-higher-numbered cache controller of the Way selection during cache entry allocation. Each subsequent, next-higher-numbered cache controller attempts to select the same Way, and advises the next-higher cache controller of its selection. As the sequential memory operation continues, the highest-numbered cache controller may continue the ripple message to the lowest-numbered cache controller, which starts the process over again. Not all the steps in FIG. 10 need be implemented to successfully provide page locality in entry allocation to cache memory.

Accordingly, the method may provide set-associative cache and multiple, interleaved cache controllers (1010), where the set-associative cache includes storage in which to store a plurality of Sets of Ways. The method may further receive an initial memory transaction (1020). The method may then select a way within the appropriate Set for the memory transaction received (1030), according to LRU or any alternate algorithm. The method may further determine whether the current cache controller is the highest-numbered cache controller (1040). If it is not, the method continues to block 1050 to transmit the identity of the Way to the next-higher numbered cache controller. If it is, the highest-numbered cache controller may transmit the identity of the Way to the lowest-numbered cache controller (1055).

With continued reference to FIG. 10, the method may then proceed with the receipt of an additional memory transaction (1060) which may be a sequential memory transaction received at the next-higher-numbered cache controller or at the lowest-numbered cache controller. The method may further decide whether the received new memory transaction is related to a received identity of the Way, in that a request is received for allocation of a new entry to an appropriate Set whose Ways enjoy page locality with the original Set (1070), e.g., the old and new Sets belong to a group (or series) of Sets that share Way locality. If not, the method may further select a Way within the appropriate Set for the transaction received (1030) without reference to a received identity of the Way.

With continued reference to FIG. 10, if it was determined at block 1070 that the received new memory transaction is related to a received identity of the Way, the method may continue by determining whether it is able to allocate to the new appropriate Set according to the Way of the received identity of the Way (1080). If yes, the method may further select the same Way for the new appropriate Set within the set-associative cache to which to allocate cache entries (1090) and may then proceed to determine whether the current cache controller is the highest-numbered cache controller (1040). If not, the method may further select a Way within the appropriate Set for the transaction received without reference to received identity of the Way (1030).

The steps of the various methods and algorithms of FIGS. 8, 9 and 10 (and others) discussed herein may be combined in other ways not specifically described in the present disclosure, so long as the outcome is to bias selection of a Way within a Set and/or within a sequential, subsequent Set of set-associative cache. The biasing may occur across memory allocations for a sequential memory transaction. In just one example, the method of FIG. 10 may be combined with that of FIG. 9, and instead of a cache controller sequentially informing the next-higher-numbered cache controller, may instead broadcast the selected Way to all of the cache controllers for use until a cache controller receives a request that does not, in Way data storage, have locality with the allocated Sets and Way of the previous controller or until some other reset in cache controller allocation.

FIG. 11A is a block diagram illustrating a micro-architecture for a processor 1100 that is used with a memory-side cache that creates page locality across interleaved cache controllers that allocate entries to fast-access cache memory according to one embodiment. Specifically, processor 1100 depicts an in-order architecture core and a register renaming logic, out-of-order issue/execution logic to be included in a processor according to at least one embodiment of the disclosure. The embodiments of the page additions and content copying can be implemented in processor 1100.

Processor 1100 includes a front end unit 1130 coupled to an execution engine unit 1150, and both are coupled to a memory unit 1170. The processor 1100 may include a reduced instruction set computing (RISC) core, a complex instruction set computing (CISC) core, a very long instruction word (VLIW) core, or a hybrid or alternative core type. As yet another option, processor 1100 may include a special-purpose core, such as, for example, a network or communication core, compression engine, graphics core, or the like. In one embodiment, processor 1100 may be a multi-core processor or may be part of a multiprocessor system.

The front end unit 1130 includes a branch prediction unit 1132 coupled to an instruction cache unit 1134, which is coupled to an instruction translation lookaside buffer (TLB) 1136, which is coupled to an instruction fetch unit 1138, which is coupled to a decode unit 1140. The decode unit 1140 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 1140 may be implemented using various different mechanisms. Examples of suitable mechanisms include, but are not limited to, look-up tables, hardware implementations, programmable logic arrays (PLAs), microcode read only memories (ROMs), etc. The instruction cache unit 1134 is further coupled to the memory unit 1170. The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservations stations (RS), central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1158 is overlapped by the retirement unit 1154 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which may include a data prefetcher 1180, a data TLB unit 1172, a data cache unit (DCU) 1174, and a level 2 (L2) cache unit 1176, to name a few examples. In some embodiments DCU 1174 is also known as a first level data cache (L1 cache). The DCU 1174 may handle multiple outstanding cache misses and continue to service incoming stores and loads. It also supports maintaining cache coherency. The data TLB unit 1172 is a cache used to improve virtual address translation speed by mapping virtual and physical address spaces. In one exemplary embodiment, the memory access units 1164 may include a load unit, a store address unit, and a store data unit, each of which is coupled to the data TLB unit 1172 in the memory unit 1170. The L2 cache unit 1176 may be coupled to one or more other levels of cache and eventually to a main memory.

In one embodiment, the data prefetcher 1180 speculatively loads/prefetches data to the DCU 1174 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 1100 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor. Note that instruction cache unit 1134, data cache unit 1174, and L2 cache unit 1176 would not generally implement the process described in this disclosure, as generally these cache units use on-die memory that does not exhibit page-locality behavior.

FIG. 11B is a block diagram illustrating an in-order pipeline and a register renaming stage, out-of-order issue/execution pipeline implemented by processor 1100 of FIG. 11A according to some embodiments of the disclosure. The solid lined boxes in FIG. 11B illustrate an in-order pipeline, while the dashed lined boxes illustrates a register renaming, out-of-order issue/execution pipeline. In FIG. 11B, a processor pipeline 1100 includes a fetch stage 1102, a length decode stage 1104, a decode stage 1106, an allocation stage 1108, a renaming stage 1110, a scheduling (also known as a dispatch or issue) stage 1112, a register read/memory read stage 1114, an execute stage 1116, a write back/memory write stage 1118, an exception handling stage 1122, and a commit stage 1124. In some embodiments, the ordering of stages 1102-1124 may be different than illustrated and are not limited to the specific ordering shown in FIG. 11B.

Figure 12:
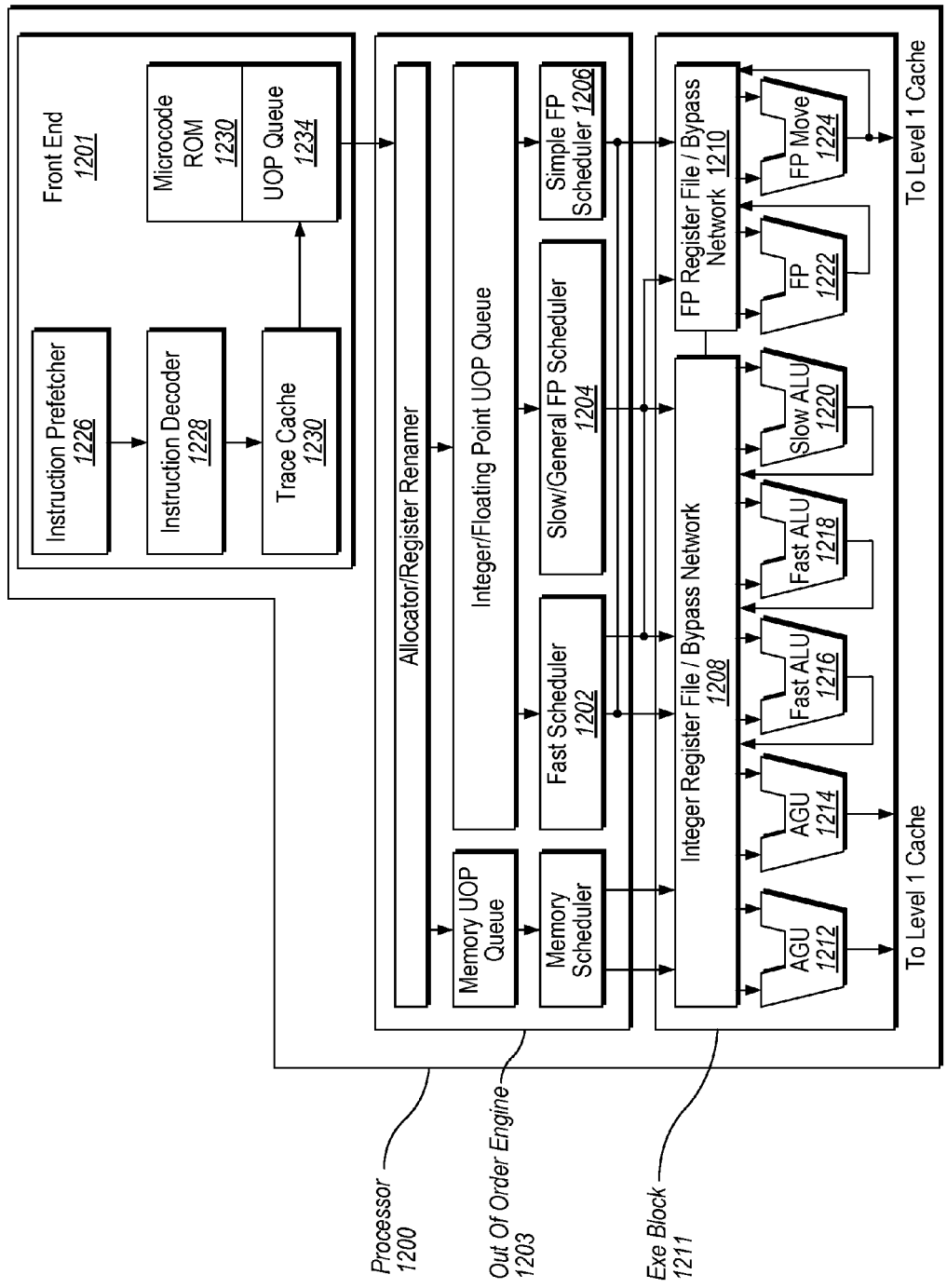
FIG. 12 illustrates a block diagram of the micro-architecture for a processor that includes logic circuits to create page locality across interleaved cache controllers that allocate entries to fast-access cache memory according to one embodiment.

FIG. 12 illustrates a block diagram of the micro-architecture for a processor 1200 that includes logic circuits that may be used with memory-side cache to create page locality across interleaved cache controllers that allocate entries to fast-access cache memory according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1201 is the part of the processor 1200 that fetches instructions to be executed and prepares them to be used later in the processor pipeline. The embodiments of the page additions and content copying can be implemented in processor 1200.

The front end 1201 may include several units. In one embodiment, the instruction prefetcher 1216 fetches instructions from memory and feeds them to an instruction decoder 1218 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 1230 takes decoded uops and assembles them into program ordered sequences or traces in the uop queue 1234 for execution. When the trace cache 1230 encounters a complex instruction, microcode ROM (or RAM) 1232 provides the uops needed to complete the operation.

Some instructions are converted into a single micro-op, whereas others need several micro-ops to complete the full operation. In one embodiment, if more than four micro-ops are needed to complete an instruction, the decoder 1218 accesses the microcode ROM 1232 to do the instruction. For one embodiment, an instruction can be decoded into a small number of micro ops for processing at the instruction decoder 1218. In another embodiment, an instruction can be stored within the microcode ROM 1232 should a number of micro-ops be needed to accomplish the operation. The trace cache 1230 refers to an entry point programmable logic array (PLA) to determine a correct micro-instruction pointer for reading the micro-code sequences to complete one or more instructions in accordance with one embodiment from the micro-code ROM 1232. After the microcode ROM 1232 finishes sequencing micro-ops for an instruction, the front end 1201 of the machine resumes fetching micro-ops from the trace cache 1230.

The out-of-order execution engine 1203 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1202, slow/general floating point scheduler 1204, and simple floating point scheduler 1206. The uop schedulers 1202, 1204, 1206, determine when a uop is ready to execute based on the readiness of their dependent input register operand sources and the availability of the execution resources the uops need to complete their operation. The fast scheduler 1202 of one embodiment can schedule on each half of the main clock cycle while the other schedulers can only schedule once per main processor clock cycle. The schedulers arbitrate for the dispatch ports to schedule uops for execution.

Register files 1208, 1210, sit between the schedulers 1202, 1204, 1206, and the execution units 1212, 1214, 1216, 1218, 1220, 1222, 1224 in the execution block 1211. There is a separate register file 1208, 1210, for integer and floating point operations, respectively. Each register file 1208, 1210, of one embodiment also includes a bypass network that can bypass or forward just completed results that have not yet been written into the register file to new dependent uops. The integer register file 1208 and the floating point register file 1210 are also capable of communicating data with the other. For one embodiment, the integer register file 1208 is split into two separate register files, one register file for the low order 32 bits of data and a second register file for the high order 32 bits of data. The floating point register file 1210 of one embodiment has 128 bit wide entries because floating point instructions typically have operands from 64 to 128 bits in width.

The execution block 1211 contains the execution units 1212, 1214, 1216, 1218, 1220, 1222, 1224, where the instructions are actually executed. This section includes the register files 1208, 1210, that store the integer and floating point data operand values that the micro-instructions need to execute. The processor 1200 of one embodiment is comprised of a number of execution units: address generation unit (AGU) 1212, AGU 1214, fast ALU 1216, fast ALU 1218, slow ALU 1210, floating point ALU 1212, floating point move unit 1214. For one embodiment, the floating point execution blocks 1212, 1214, execute floating point, MMX, SIMD, and SSE, or other operations. The floating point ALU 1212 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 1216, 1218. The fast ALUs 1216, 1218, of one embodiment can execute fast operations with an effective latency of half a clock cycle. For one embodiment, most complex integer operations go to the slow ALU 1220 as the slow ALU 1220 includes integer execution hardware for long latency type of operations, such as a multiplier, shifts, flag logic, and branch processing. Memory load/store operations are executed by the AGUs 1222, 1224. For one embodiment, the integer ALUs 1216, 1218, 1220, are described in the context of performing integer operations on 64 bit data operands. In alternative embodiments, the ALUs 1216, 1218, 1220, can be implemented to support a variety of data bits including 16, 32, 128, 256, etc. Similarly, the floating point units 1222, 1224, can be implemented to support a range of operands having bits of various widths. For one embodiment, the floating point units 1222, 1224, can operate on 128 bits wide packed data operands in conjunction with SIMD and multimedia instructions.

In one embodiment, the uops schedulers 1202, 1204, 1206, dispatch dependent operations before the parent load has finished executing. As uops are speculatively scheduled and executed in processor 1200, the processor 1200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 1200 also includes logic to create page locality across interleaved cache controllers that allocate entries to fast-access cache memory according to one embodiment. In one embodiment, the processor 1200 may include cache 125 to create page locality across interleaved cache controllers that allocate entries to fast-access cache memory according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 13:
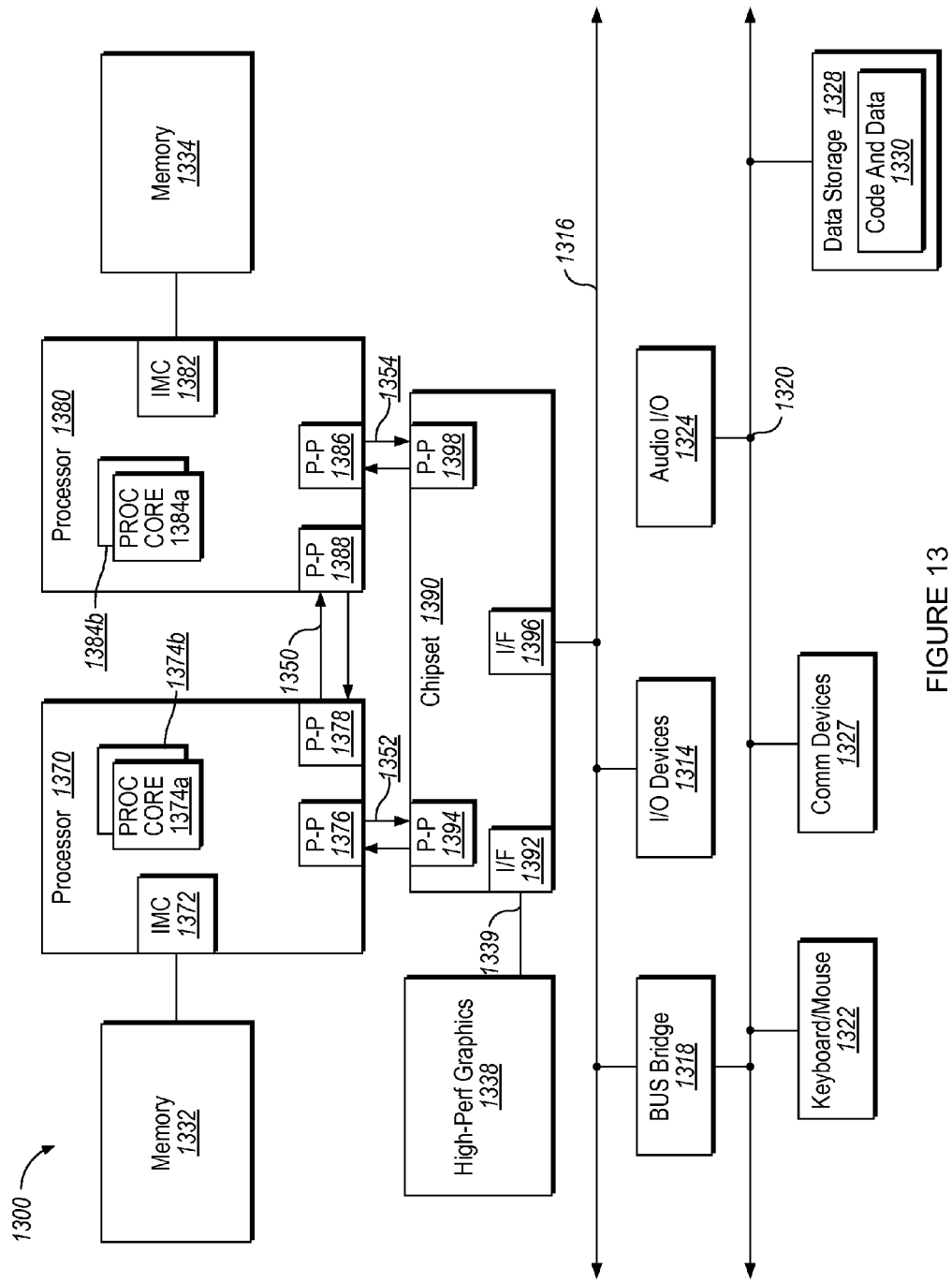
FIG. 13 is a block diagram of a computer system according to one implementation.

Embodiments may be implemented in many different system types. Referring now to FIG. 13, shown is a block diagram of a multiprocessor system 1300 in accordance with an implementation. As shown in FIG. 13, multiprocessor system 1300 is a point-to-point interconnect system, and includes a first processor 1370 and a second processor 1380 coupled via a point-to-point interconnect 1350. As shown in FIG. 13, each of processors 1370 and 1380 may be multicore processors, including first and second processor cores (i.e., processor cores 1374a and 1374b and processor cores 1384a and 1384b), although potentially many more cores may be present in the processors.

While shown with two processors 1370, 1380, it is to be understood that the scope of the present disclosure is not so limited. In other implementations, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1388; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors. The cache 125 of FIG. 1 may be integrated into the IMC 1372 and/or the IMC 1382 as memory-side cache, in which to create page locality across interleaved cache controllers that allocate entries to fast-access cache memory according to another embodiment of the present disclosure.

Processors 1370, 1380 may each exchange information with a chipset 1390 via individual P-P interfaces 1352, 1354 using point to point interface circuits 1376, 1394, 1386, 1398. Chipset 1390 may also exchange information with a high-performance graphics circuit 1338 via a high-performance graphics interface 1339.

A shared cache (not shown) may be included in either processor or outside of both processors, yet connected with the processors via P-P interconnect, such that either or both processors' local cache information may be stored in the shared cache if a processor is placed into a low power mode. Page locality may also be created in the shared cache across one or more cache controllers when allocating entries to the shared cache.

Chipset 1390 may be coupled to a first bus 1316 via an interface 1396. In one embodiment, first bus 1316 may be a Peripheral Component Interconnect (PCI) bus, or a bus such as a PCI Express bus or interconnect bus, although the scope of the present disclosure is not so limited.

Figure 14:
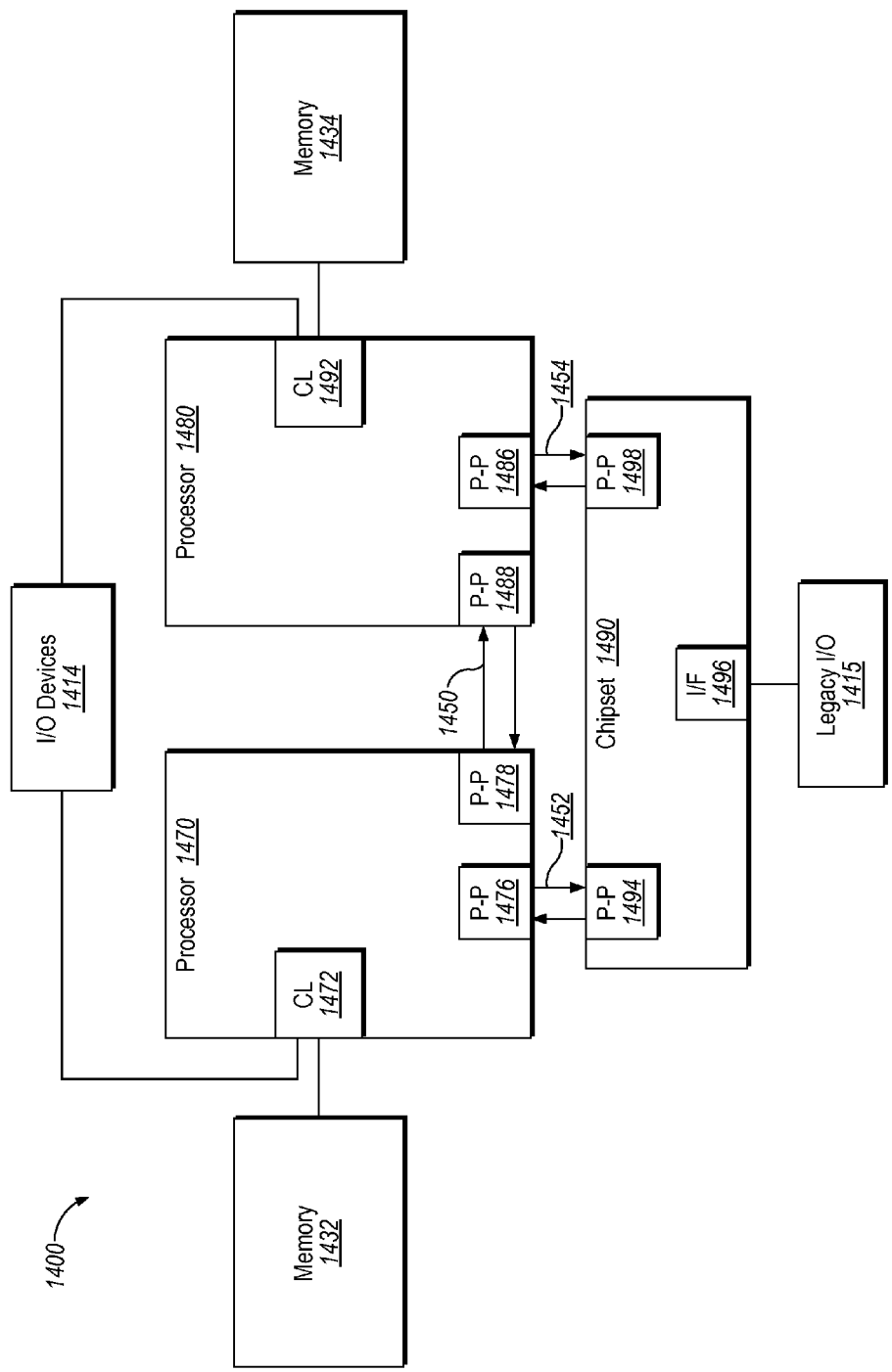
FIG. 14 is a block diagram of a computer system according to another implementation.

Referring now to FIG. 14, shown is a block diagram of a third system 1300 in accordance with an embodiment of the present disclosure. Like elements in FIGS. 13 and 14 bear like reference numerals, and certain aspects of FIG. 14 have been omitted from FIG. 13 in order to avoid obscuring other aspects of FIG. 14.

FIG. 14 illustrates that the processors 1470, 1480 may include integrated memory and I/O control logic ("CL") 1472 and 1492, respectively. For at least one embodiment, the CL 1472, 1482 may include integrated memory controller units such as described herein. In addition. CL 1472, 1492 may also include I/O control logic. FIG. 14 illustrates that the memories 1432, 1434 are coupled to the CL 1472, 1492, and that I/O devices 1414 are also coupled to the control logic 1472, 1492. Legacy I/O devices 1415 are coupled to the chipset 1490. The cache 125 of FIG. 1 may be integrated into the CL 1472 and/or the CL 1492 as memory-side cache, in which to create page locality across interleaved cache controllers that allocate entries to fast-access cache memory according to another embodiment of the present disclosure.

Figure 15:
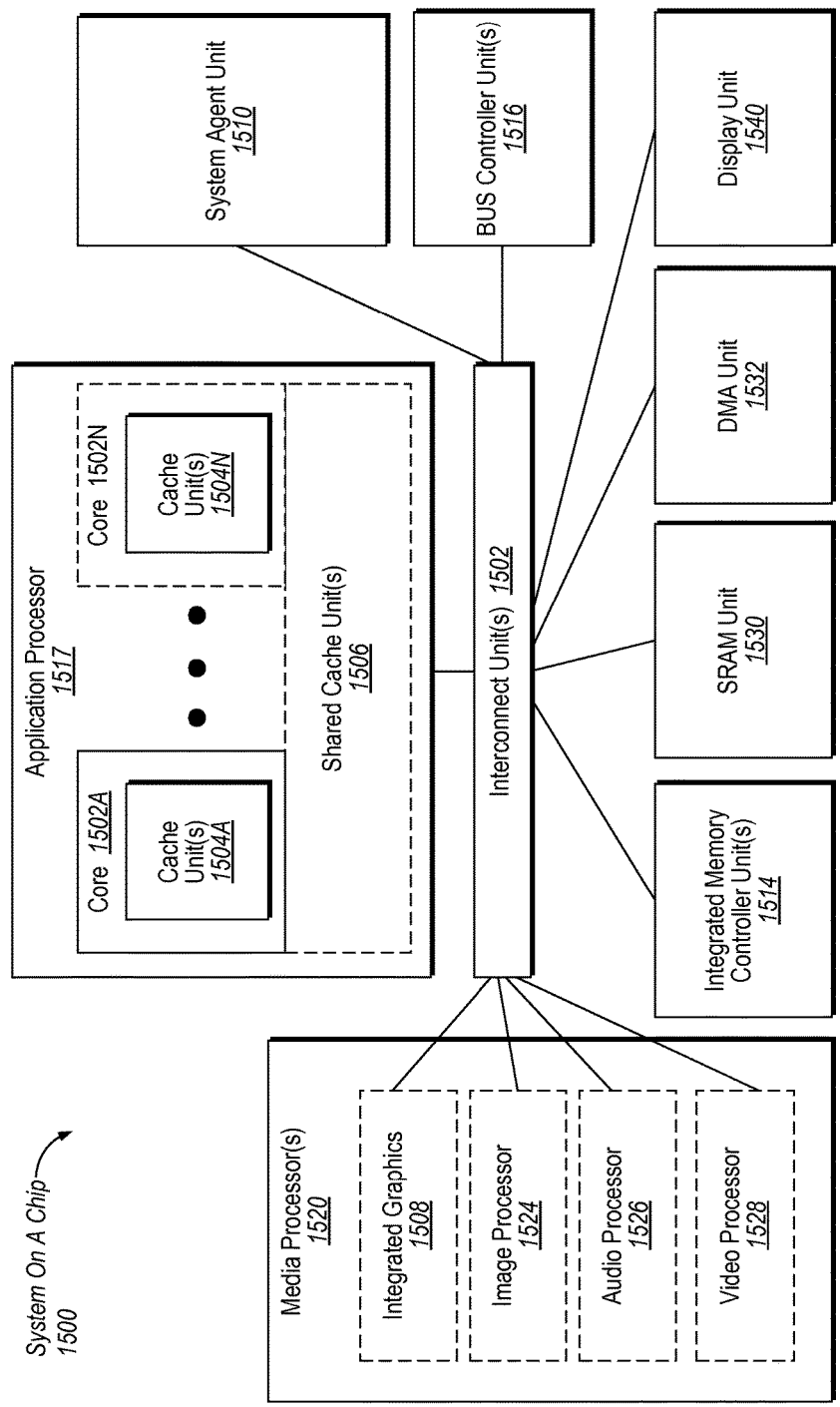
FIG. 15 is a block diagram of a system-on-a-chip according to one implementation.

FIG. 15 is an exemplary system on a chip (SoC) 1500 that may include one or more of the cores 1502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1500 of FIG. 15, dashed lined boxes are features on more advanced SoCs. An interconnect unit(s) 1502 may be coupled to: an application processor 1517 which includes a set of one or more cores 1502A-N and shared cache unit(s) 1506; a system agent unit 1510; a bus controller unit(s) 1516; an integrated memory controller unit(s) 1514; a set or one or more media processors 1520 which may include integrated graphics logic 1508, an image processor 1524 for providing still and/or video camera functionality, an audio processor 1526 for providing hardware audio acceleration, and a video processor 1528 for providing video encode/decode acceleration; a static random access memory (SRAM) unit 1530; a direct memory access (DMA) unit 1532; and a display unit 1540 for coupling to one or more external displays.

Figure 16:
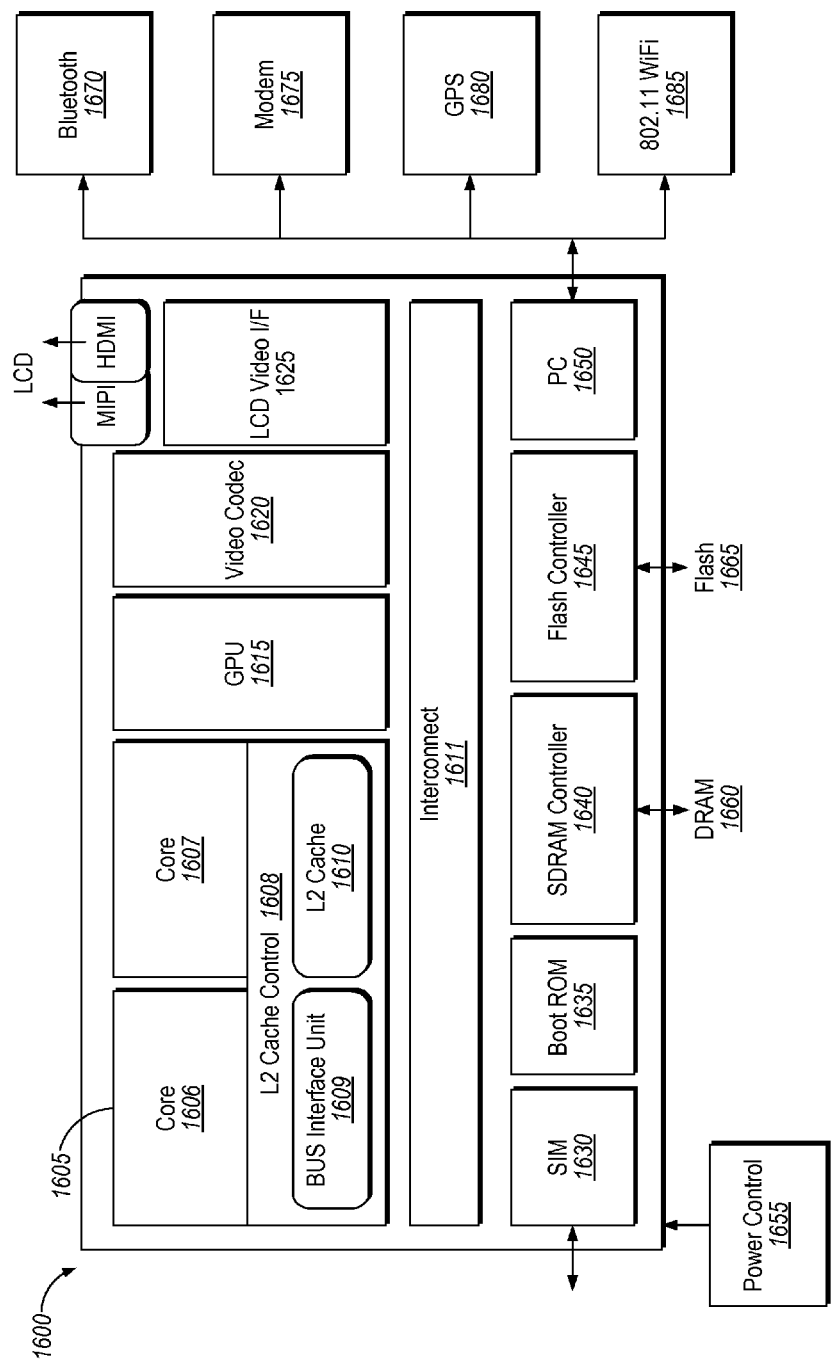
FIG. 16 illustrates another implementation of a block diagram for a computing system.

Turning next to FIG. 16, an embodiment of a system on-chip (SoC) design in accordance with embodiments of the disclosure is depicted. As an illustrative example, SoC 1600 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1600.

Here, SoC 1600 includes 2 cores-1606 and 1607. Similar to the discussion above, cores 1606 and 1607 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1606 and 1607 are coupled to cache control 1608 that is associated with bus interface unit 1609 and L2 cache 1610 to communicate with other parts of system 1600. Interconnect 1611 includes an on-chip interconnect, such as an IOSF, AMBA, or other interconnects discussed above, which can implement one or more aspects of the described disclosure.

In one embodiment, SDRAM controller 1640 may connect to interconnect 1611 via cache 125. Interconnect 1611 provides communication channels to the other components, such as a Subscriber Identity Module (SIM) 1630 to interface with a SIM card, a boot ROM 1635 to hold boot code for execution by cores 1606 and 1607 to initialize and boot SoC 1600, a SDRAM controller 1640 to interface with external memory (e.g. DRAM 1660), a flash controller 1645 to interface with non-volatile memory (e.g. Flash 1665), a peripheral control 1650 (e.g. Serial Peripheral Interface) to interface with peripherals, video codecs 1620 and Video interface 1625 to display and receive input (e.g. touch enabled input), GPU 1615 to perform graphics related computations, etc. Any of these interfaces may incorporate aspects of the embodiments described herein.

In addition, the system illustrates peripherals for communication, such as a Bluetooth module 1670, 3G modem 1675, GPS 1680, and Wi-Fi 1685. Note as stated above, a UE includes a radio for communication. As a result, these peripheral communication modules may not all be included. However, in a UE some form of a radio for external communication should be included.

Figure 17:
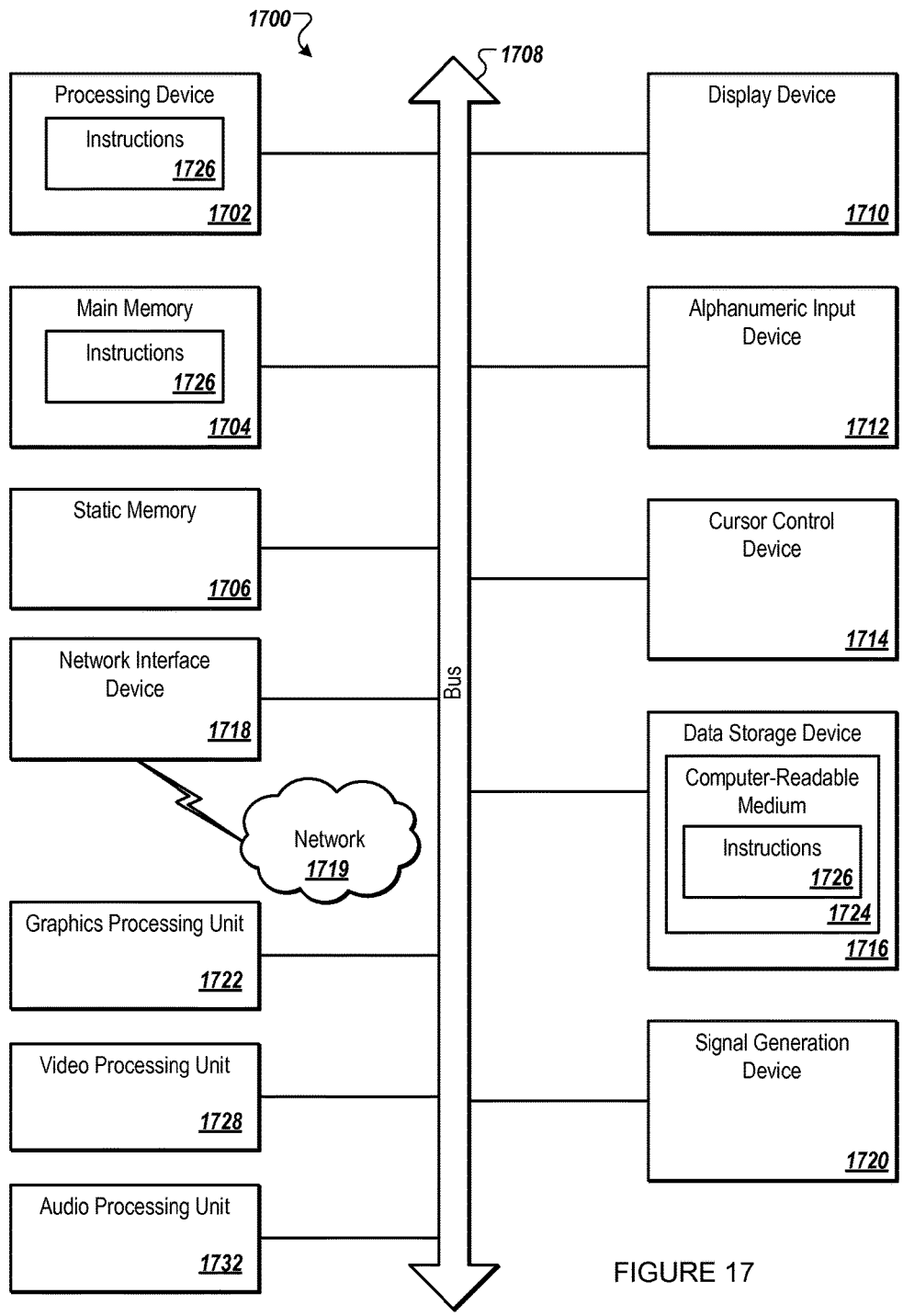
FIG. 17 illustrates another implementation of a block diagram for a computing system.

FIG. 17 illustrates a diagrammatic representation of a machine in the example form of a computing system 1700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1700.

The computing system 1700 includes a processing device 1702, main memory 1704 (e.g., flash memory, dynamic random access memory (DRAM) (such as synchronous DRAM (SDRAM) or DRAM (RDRAM), etc.), a static memory 1706 (e.g., flash memory, static random access memory (SRAM), etc.), and a data storage device 1718, which communicate with each other via a bus 1708.

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. In one embodiment, processing device 1702 may include one or processor cores. The processing device 1702 is configured to execute the processing logic 1726 for performing the operations discussed herein.

In one embodiment, processing device 1702 can be part of the computing system architecture 100 of FIG. 1. Alternatively, the computing system 1700 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1700 may further include a network interface device 1718 communicably coupled to a network 1719. The computing system 1700 also may include a video display device 1710 (e.g., a liquid crystal display (LCD) or a cathode ray tube (CRT)), an alphanumeric input device 1710 (e.g., a keyboard), a cursor control device 1714 (e.g., a mouse), a signal generation device 1720 (e.g., a speaker), or other peripheral devices. Furthermore, computing system 1700 may include a graphics processing unit 1722, a video processing unit 1728 and an audio processing unit 1732. In another embodiment, the computing system 1700 may include a chipset (not illustrated), which refers to a group of integrated circuits, or chips, that are designed to work with the processing device 1702 and controls communications between the processing device 1702 and external devices. For example, the chipset may be a set of chips on a motherboard that links the processing device 1702 to very high-speed devices, such as main memory 1704 and graphic controllers, as well as linking the processing device 1702 to lower-speed peripheral buses of peripherals, such as USB, PCI or ISA buses.

The data storage device 1718 may include a computer-readable storage medium 1724 on which is stored software 1726 embodying any one or more of the methodologies of functions described herein. The software 1726 may also reside, completely or at least partially, within the main memory 1704 as instructions 1726 and/or within the processing device 1702 as processing logic during execution thereof by the computing system 1700; the main memory 1704 and the processing device 1702 also constituting computer-readable storage media.

The computer-readable storage medium 1724 may also be used to store instructions 1726 utilizing the processing device 1702, such as described with respect to FIGS. 1, 4, 7A and 7B, and/or a software library containing methods that call the above applications. While the computer-readable storage medium 1724 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is an integrated circuit comprising: 1) a cache controller to allocate memory within set-associative cache comprising a plurality of Sets of Ways, and to: a) select a Way from a Set to which to allocate new entries in the set-associative cache; and b) bias selection of the Way according to a plurality of upper address bits of memory transactions that are identical at the cache controller during sequential memory transactions.

In Example 2, the integrated circuit of Example 1, wherein a cache controller comprises a plurality of interleaved cache controllers, and wherein the Way is selected from a series of Sets within the plurality of Sets of Ways.

In Example 3, the integrated circuit of Examples 2, wherein same-numbered Ways of a series of Sets belong to a page within the set-associative cache.

In Example 4, the integrated circuit of Example 1, wherein the cache controller comprises a first cache controller and a second cache controller ordered sequentially after the first cache controller, the first cache controller to identify the Way for the second cache controller.

In Example 5, the integrated circuit of Examples 4, wherein the first cache controller is a lowest-numbered cache controller and the second cache controller is a next-higher-numbered cache controller.

Various embodiments may have different combinations of the structural features described above. For instance, all optional features of the computing system described above may also be implemented with respect to the method or process described herein and specifics in the examples may be used anywhere in one or more embodiments.

Example 6 is a system comprising: 1) set-associative cache including a data storage in which to store: data in a plurality of Sets of Ways and metadata related to the data in respective Ways of the plurality of Sets of Ways; and 2) a cache controller to: a) select a Way within a Set of the plurality of Sets of Ways to which to allocate new entries based on analysis of the metadata; and b) allocate the new entries to the Way that was selected.

In Example 7, the system of Example 6, further comprising a processor to analyze the metadata, wherein the cache controller is integrated as a part of the processor, and wherein the metadata belongs to the cache controller when making a Way selection.

In Example 8, the system of Examples 7, wherein the cache controller comprises a plurality of interleaved cache controllers, and the processor further to communicate an identity of the Way to the plurality of interleaved cache controllers such that the plurality of interleaved cache controllers allocate sequential entries of a memory transaction to the Way of the Set.

In Example 9, the system of Examples 6, wherein, to select the Way, the cache controller is further to: a) identify an available number of Ways in the Set; b) determine a preferred Way that is available in response to executing a function; c) determine whether the preferred Way is among the Ways available within the Set; and e) select the Way for allocation of new entries as the preferred Way when the preferred Way is among the Ways available within the Set.

In Example 10, the system of Example 9, wherein the cache controller further to identify the available number of Ways in the Set based on a number of least recently used clean entries and a number of least recently used dirty entries in the set.

Various embodiments may have different combinations of the structural features described above. For instance, all optional features of the processors and methods described above may also be implemented with respect to a system described herein and specifics in the examples may be used anywhere in one or more embodiments Example 11 is a system on a chip (SoC) comprising: 1) interleaved first and second cache controllers to allocate memory entries to a plurality of Sets of Ways within set-associative cache, the second cache controller being sequentially-numbered after the first cache controller; the first cache controller further to: a) select a Way within a Set of the plurality of Sets of Ways to which to allocate an entry during a memory transaction; and b) transmit to the second cache controller an identity of the Way that was selected for the Set; and c) the second cache controller to also select the Way for cache entry allocation, when available, in response to receipt of the identity of the Way from the first cache controller.

In Example 12, the SoC of Example 11, wherein the first cache controller is a lowest-numbered cache controller and the second cache controller is a next-higher-numbered cache controller.

In Example 13, the SSD of Example 11, wherein the first cache controller and the second cache controller comprise a plurality of cache controllers, and wherein each of the plurality of the cache controllers to transmit the identity of the Way to a sequentially next-higher-numbered cache controller during memory allocation for sequential memory transactions.

In Example 14, the SoC of Example 13, wherein each sequentially next-higher-numbered cache controller further to prefer to allocate to the Way in response to receipt of the identity of the Way selected for memory allocation from a lower-numbered cache controller.

In Example 15, the SoC of Examples 13, wherein each sequentially next-higher-numbered cache controller further to: a) determine whether it is a highest-numbered cache controller; b) transmit the identity of the Way to a lowest-numbered cache controller in response to determining that it is the highest-numbered cache controller and that it is processing a sequential memory transaction; and c) cease to transmit the identity of the Way to the next-higher-numbered cache controller upon receiving a request that does not, in Way data storage, have locality with the Way of the Set selected by a previous cache controller.

In Example 16, the SoC of Example 15, wherein the Set comprises a first Set, and wherein the lowest-numbered cache controller further to transmit the identity of the Way to the next-higher-numbered cache controller in response to the determining that a request for a new entry is to a second Set having page locality with the first Set.

Various embodiments may have different combinations of the structural features described above. For instance, all optional features of the processors and methods described above may also be implemented with respect to a system described herein and specifics in the examples may be used anywhere in one or more embodiments Example 17 is a system comprising: 1) set-associative cache including a data storage in which to store data in a plurality of Sets of Ways; and 2) a cache controller to: a) identify an available number of Ways in a Set of the set-associative cache; b) determine a preferred Way within the plurality of Sets of Ways in response to executing a function related to one or more requests received by the cache controller; c) determine whether the preferred Way is among the Ways available within the Set; and d) select the preferred Way as the Way to which to allocate new entries when the preferred Way is among the Ways available within the Set.

In Example 18, the system of Example 17, wherein the cache controller comprises a plurality of interleaved cache controllers, and wherein the Way is selected from an identically-numbered series of Sets.

Example 19, the system of Example 18, wherein the function is based on system address bits that do not contribute to selection of the cache controller among the interleaved cache controllers.

In Example 20, the system of Example 17, further comprising a processor to execute the function, wherein the cache controller is integrated as a part of the processor.

In Example 21, the system of Example 17, wherein the cache controller further to select the Way for new entries based on a least recently used (LRU) algorithm when the preferred Way is not among the ways available within the set.

In Example 22, the system of Example 17, wherein the cache controller further to identify the available number of Ways in the Set based on a number of least recently used clean entries and a number of least recently used dirty entries in the set.

In Example 23, the system of Example 17, wherein the function is based on system address bits related to the one or more requests for which memory allocation is requested.

In Example 24, the system of Example 17, wherein the function is based on system address bits that do not contribute to selection of the Set.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to creating page locality across interleaved cache controllers that allocate entries to fast-access cache memory in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An integrated circuit comprising:
a cache controller to allocate memory within set-associative cache comprising a plurality of Sets of Ways, wherein the cache controller comprises a plurality of interleaved cache controllers and is to:
   select a Way, from a series of Sets within the plurality of Sets of Ways, to which to allocate new entries in the set-associative cache; and
   bias selection of the Way according to a plurality of upper address bits of memory transactions that are identical at the cache controller during sequential memory transactions.

2. The integrated circuit of claim 1, wherein same-numbered Ways of a series of Sets belong to a page within the set-associative cache.

3. The integrated circuit of claim 1, wherein the cache controller comprises a first cache controller and a second cache controller ordered sequentially after the first cache controller, the first cache controller to identify the Way for the second cache controller.

4. The integrated circuit of claim 3, wherein the first cache controller is a lowest-numbered cache controller and the second cache controller is a next-higher-numbered.

5. A system comprising:
set-associative cache including a data storage in which to store: data in a plurality of Sets of Ways and metadata related to the data in respective Ways of the plurality of Sets of Ways, the metadata comprising a tag, valid bits, and dirty bits; and
a cache controller coupled to the data storage, wherein the cache controller comprises a plurality of interleaved cache controllers and is to:
   select a Way, from a series of Sets within the plurality of Sets of Ways, to which to allocate new entries based on analysis of the metadata; and
   allocate the new entries to the Way that was selected.

6. The system of claim 5, further comprising a processor to analyze the metadata, wherein the cache controller is integrated as a part of the processor, and wherein the metadata belongs to the cache controller when making a Way selection.

7. The system of claim 6, wherein the processor is further to communicate an identity of the Way to the plurality of interleaved cache controllers such that the plurality of interleaved cache controllers allocate sequential entries of a memory transaction to the Way of the series of Sets.

8. The system of claim 5, wherein, to select the Way, the cache controller is further to:
identify an available number of Ways in the series of Sets;
determine a preferred Way that is available in response to execution of a function;
determine whether the preferred Way is among the Ways available within the series of Sets; and select the Way for allocation of new entries as the preferred Way when the preferred Way is among the Ways available within the series of Sets.

9. The system of claim 8, wherein the cache controller further to identify the available number of Ways in the series of Sets based on a number of least recently used clean entries and a number of least recently used dirty entries in the series of Sets.

10. A system on a chip (SoC) comprising:
interleaved first and second cache controllers to allocate memory entries to a plurality of Sets of Ways within set-associative cache, the second cache controller being sequentially-numbered after the first cache controller;
the first cache controller further to:
select a Way within a Set of the plurality of Sets of Ways to which to allocate an entry for a memory transaction; and
transmit to the second cache controller an identity of the Way that was selected for the Set; and
the second cache controller further to also select the Way for cache entry allocation, when available, in response to receipt of the identity of the Way from the first cache controller.

11. The SoC of claim 10, wherein the first cache controller is a lowest-numbered cache controller and the second cache controller is a next-higher-numbered cache controller.

12. The SoC of claim 10, wherein the first cache controller and the second cache controller comprise a plurality of cache controllers, and wherein each of the plurality of the cache controllers to transmit the identity of the Way to a sequentially next-higher-numbered cache controller during memory allocation for sequential memory transactions.

13. The SoC of claim 12, wherein each sequentially next-higher-numbered cache controller further to prefer to allocate to the Way in response to receipt of the identity of the Way selected for memory allocation from a lower-numbered cache controller.

14. The SoC of claim 12, wherein each sequentially next-higher-numbered cache controller further to:
determine whether it is a highest-numbered cache controller;
transmit the identity of the Way to a lowest-numbered cache controller in response to a determination that it is the highest-numbered cache; and
cease to transmit the identity of the Way to the next-higher-numbered cache controller upon receipt of a request that does not, in Way data storage, have locality with the Way of the Set selected by a previous cache controller.

15. The SoC of claim 14, wherein the Set comprises a first Set, and wherein the lowest-numbered cache controller further to transmit the identity of the Way to the next-higher-numbered cache controller in response to the determination that a request for a new entry is to a second Set having page locality with the first Set.

16. A system comprising:
set-associative cache including a data storage in which to store data in a plurality of Sets of Ways; and
a cache controller, of a plurality of interleaved cache controllers coupled to the data storage, to:
identify an available number of Ways in a Set of the set-associative cache, the Set being one of an identically-numbered series of Sets;
determine a preferred Way within the plurality of Sets of Ways in response to execution of a function related to one or more requests received by the cache controller;
determine whether the preferred Way is among the Ways available within the Set; and
select the preferred Way as the Way to which to allocate new entries when the preferred Way is among the Ways available within the Set.

17. The system of claim 16, wherein the function is based on system address bits that do not contribute to selection of the cache controller among the interleaved cache controllers.

18. The system of claim 16, further comprising a processor to execute the function, wherein the cache controller is integrated as a part of the processor.

19. The system of claim 16, wherein the cache controller further to select the Way for new entries based on a least recently used (LRU) algorithm when the preferred Way is not among the ways available within the set.

20. The system of claim 16, wherein the cache controller further to identify the available number of Ways in the Set based on a number of least recently used clean entries and a number of least recently used dirty entries in the set.

21. The system of claim 16, wherein the function is based on system address bits related to the one or more requests for which memory allocation is requested.

22. The system of claim 16, wherein the function is based on system address bits that do not contribute to selection of the preferred Way.

* * * * *